(12) United States Patent
Sadr

(10) Patent No.: US 9,014,635 B2
(45) Date of Patent: *Apr. 21, 2015

(54) RFID BEAM FORMING SYSTEM

(71) Applicant: Mojix, Inc., Los Angeles, CA (US)

(72) Inventor: Ramin Sadr, Los Angeles, CA (US)

(73) Assignee: Mojix, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,888

(22) Filed: Jun. 16, 2014

(65) Prior Publication Data

US 2014/0292492 A1    Oct. 2, 2014

Related U.S. Application Data

(63) Continuation of application No. 12/982,557, filed on Dec. 30, 2010, now Pat. No. 8,768,248, which is a continuation of application No. 11/770,712, filed on Jun. 28, 2007, now Pat. No. 7,873,326.

(60) Provisional application No. 60/807,064, filed on Jul. 11, 2006.

(51) Int. Cl.
*H04B 7/00*      (2006.01)
*G06K 7/10*      (2006.01)
(Continued)

(52) U.S. Cl.
CPC .......... *G06K 7/10316* (2013.01); *G06K 7/0008* (2013.01); *H01Q 1/2216* (2013.01); *H01Q 3/30* (2013.01); *H01Q 25/00* (2013.01)

(58) Field of Classification Search
CPC ....... H01Q 1/2216; H01Q 3/26; H01Q 25/00; H04B 5/00
USPC ................ 455/41.1, 41.2, 13.3, 67.11, 67.16, 455/562.1, 575.7, 269, 272; 370/335, 339, 370/338; 340/10.1, 10.3, 572.1, 539.22
See application file for complete search history.

(56) References Cited

U.S. PATENT DOCUMENTS

| 3,130,408 A | 4/1964 | Kumano |
| 4,903,033 A | 2/1990 | Tsao et al. |

(Continued)

FOREIGN PATENT DOCUMENTS

| WO | 2006026518 A2 | 3/2006 |
| WO | 2006099148 A1 | 9/2006 |

OTHER PUBLICATIONS

"OMRON Develops World-First RFID Technology for Measuring the Distance Between UHF-Band Antenna and IC Tags," http://www.finanznachrichten.de/nachrichten-2007-09/artikel-8988010.asp, Sep. 10, 2007.

(Continued)

*Primary Examiner* — Tuan Pham
(74) *Attorney, Agent, or Firm* — KPPB LLP

(57) ABSTRACT

A multi-protocol, multi-band array antenna system may be used in Radio Frequency Identification (RFID) system reader and sensory networks. The antenna array may include array elements with an integrated low noise amplifier. The system may employ digital beam forming techniques for transmission and steering of a beam to a specific sensor tag or group of tags in a cell. The receive beam forming network is optimized for detecting signals from each sensor tag. Narrow and wideband interferences may be excised by an interference nulling algorithm. Space division multiplexing may be used by the antenna system to enhance system processing capacity.

50 Claims, 17 Drawing Sheets

(51) Int. Cl.
*G06K 7/00* (2006.01)
*H01Q 1/22* (2006.01)
*H01Q 3/30* (2006.01)
*H01Q 25/00* (2006.01)

(56) References Cited

U.S. PATENT DOCUMENTS

| | | | |
|---|---|---|---|
| 5,001,492 A | 3/1991 | Shapiro et al. | |
| 5,061,943 A | 10/1991 | Rammos | |
| 5,227,803 A | 7/1993 | O'Connor et al. | |
| 5,448,250 A | 9/1995 | Day | |
| 5,955,966 A | 9/1999 | Jeffryes et al. | |
| 6,037,898 A | 3/2000 | Parish et al. | |
| 6,042,547 A | 3/2000 | Wright et al. | |
| 6,127,981 A | 10/2000 | Pritchett et al. | |
| 6,184,841 B1 | 2/2001 | Shober et al. | |
| 6,236,367 B1 | 5/2001 | Du Toit et al. | |
| 6,252,542 B1 | 6/2001 | Sikina et al. | |
| 6,252,553 B1 | 6/2001 | Solomon | |
| 6,377,217 B1 | 4/2002 | Zhu et al. | |
| 6,396,438 B1 | 5/2002 | Seal | |
| 6,531,984 B1 | 3/2003 | Johannisson et al. | |
| 6,549,166 B2 | 4/2003 | Bhattacharyya et al. | |
| 6,750,757 B1 | 6/2004 | Gabig, Jr. et al. | |
| 6,831,608 B2 | 12/2004 | Arvidsson | |
| 6,897,809 B2 | 5/2005 | Carson et al. | |
| 6,903,656 B1 | 6/2005 | Lee | |
| 6,982,670 B2 | 1/2006 | Mohamadi | |
| 6,995,711 B2 | 2/2006 | Killen et al. | |
| 7,002,461 B2 | 2/2006 | Duncan et al. | |
| 7,030,761 B2 | 4/2006 | Bridgelall et al. | |
| 7,161,489 B2 | 1/2007 | Sullivan et al. | |
| 7,187,288 B2 | 3/2007 | Mendolia et al. | |
| 7,212,116 B2 | 5/2007 | Wang et al | |
| 7,289,064 B2 | 10/2007 | Cheng | |
| 7,345,625 B1 | 3/2008 | Urkowitz | |
| 7,362,266 B2 | 4/2008 | Collinson | |
| 7,378,967 B2 | 5/2008 | Sullivan et al. | |
| 7,423,586 B2 | 9/2008 | Schieblich | |
| 7,432,855 B2 | 10/2008 | Mohamadi | |
| 7,432,874 B2 | 10/2008 | Meissner | |
| 7,561,053 B2 | 7/2009 | Hecht et al. | |
| 7,652,577 B1 | 1/2010 | Madhow et al. | |
| 7,873,326 B2 * | 1/2011 | Sadr | 455/67.16 |
| 8,768,248 B2 * | 7/2014 | Sadr | 455/41.1 |
| 2002/0042290 A1 | 4/2002 | Williams et al. | |
| 2002/0093454 A1 | 7/2002 | Kim et al. | |
| 2002/0113736 A1 | 8/2002 | Toutain et al. | |
| 2002/0135513 A1 * | 9/2002 | Paschen et al. | 342/371 |
| 2002/0159540 A1 | 10/2002 | Chiodini | |
| 2003/0007473 A1 | 1/2003 | Strong et al. | |
| 2004/0042539 A1 | 3/2004 | Vishakhadatta et al. | |
| 2004/0061644 A1 | 4/2004 | Lier et al. | |
| 2005/0018861 A1 | 1/2005 | Tashev | |
| 2005/0141459 A1 | 6/2005 | Li et al. | |
| 2005/0237953 A1 | 10/2005 | Carrender et al. | |
| 2005/0280508 A1 | 12/2005 | Mravca et al. | |
| 2006/0022800 A1 | 2/2006 | Krishna et al. | |
| 2006/0033609 A1 | 2/2006 | Bridgelall | |
| 2006/0044147 A1 | 3/2006 | Knox et al. | |
| 2006/0103576 A1 | 5/2006 | Mahmoud et al. | |
| 2006/0135211 A1 | 6/2006 | Chae et al. | |
| 2006/0170565 A1 | 8/2006 | Husak et al. | |
| 2006/0279458 A1 * | 12/2006 | Mohamadi | 342/368 |
| 2006/0291544 A1 | 12/2006 | Fischer et al. | |
| 2007/0149251 A1 | 6/2007 | Jeon | |
| 2007/0176824 A1 | 8/2007 | Stumbo et al. | |
| 2008/0012710 A1 | 1/2008 | Sadr | |
| 2008/0030422 A1 | 2/2008 | Gevargiz et al. | |
| 2008/0042847 A1 | 2/2008 | Hollister et al. | |
| 2008/0061984 A1 | 3/2008 | Breed et al. | |
| 2008/0068265 A1 | 3/2008 | Kalliola et al. | |
| 2008/0242240 A1 | 10/2008 | Rofougaran et al. | |
| 2008/0318632 A1 | 12/2008 | Rofougaran et al. | |
| 2011/0090059 A1 | 4/2011 | Sadr | |

OTHER PUBLICATIONS

Mudumbai, R. et al., "Scalable Feedback Control for Distributed Beamforming in Sensor Networks," Proc. 2005 IEEE International Symposium on Information Theory (ISIT 2005), Sep. 2005.
Widrow, Bernard et al., "A Comparison of Adaptive Algorithms Based on the Methods of Steepest Descent and Random Search," IEEE Transactions on Antennas and Propagation, vol. 24, No. 5, pp. 615-637, Sep. 1976.
Extended European Search Report for European Application EP07840315.1, Mailed Aug. 28, 2014, Report Completed Aug. 22, 2014, 5 pages.

* cited by examiner

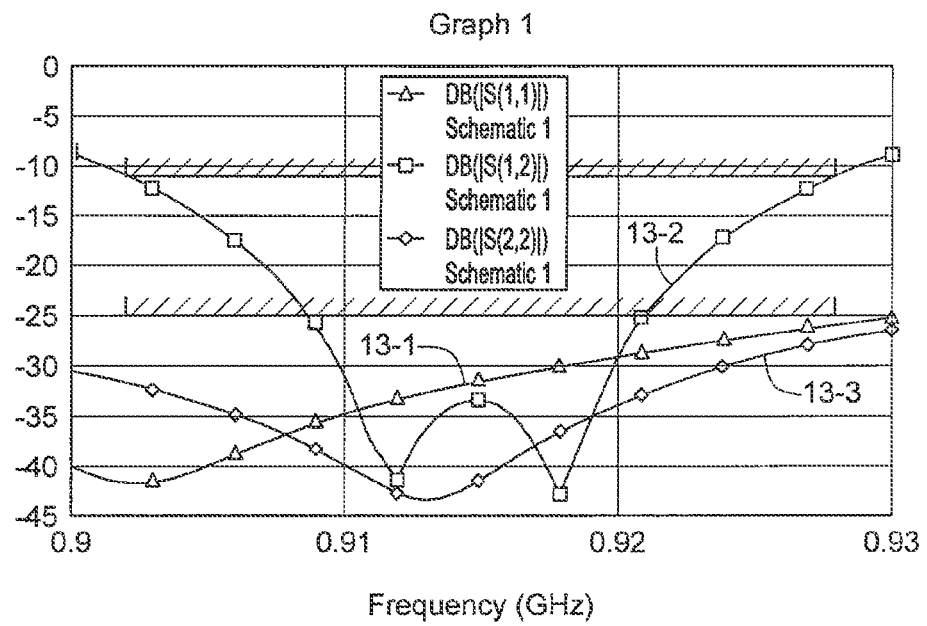
Fig. 13
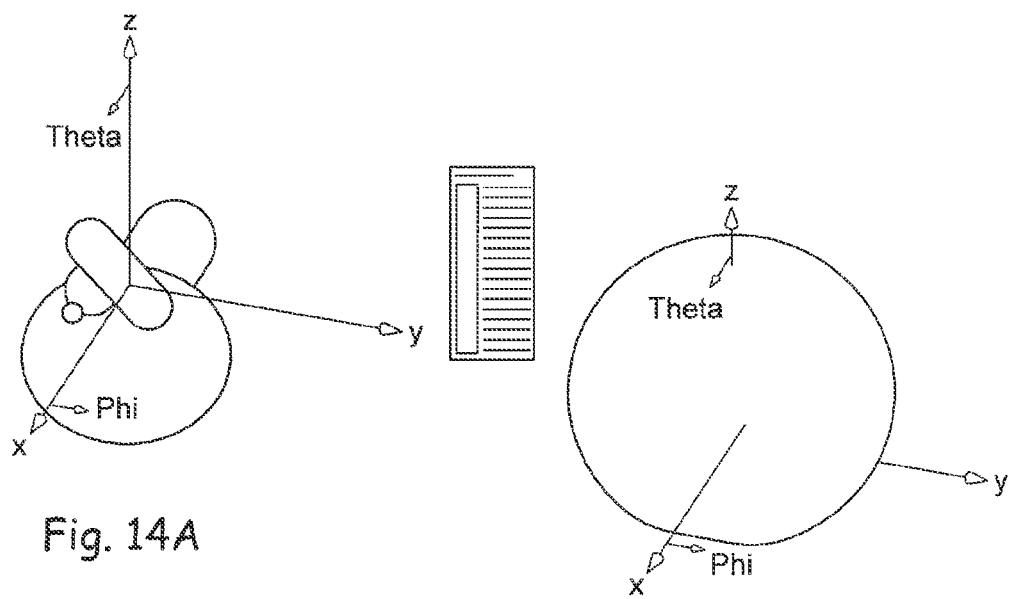
Fig. 14A
Fig. 14B

RFID BEAM FORMING SYSTEM

CROSS REFERENCE TO RELATED APPLICATIONS

This application is a continuation application of U.S. patent application Ser. No. 12/982,557 filed Dec. 30, 2010 entitled "RFID Beam Forming System", which is a continuation application of U.S. patent application Ser. No. 11/770,712 which claimed the benefit of the filing of provisional application Ser. No. 60/807,064 filed Jul. 11, 2006.

BACKGROUND OF THE INVENTION

1. Field of the Invention

This application relates to antenna systems used with passive or active sensors and in particular relates to antenna array systems and protocols used in Radio Frequency Identification (RFID) system base station and sensory networks.

2. Background of the Invention

An RFID system conventionally includes a set of stationary or mobile RFID tags located within a physical area readable by a base station reader. Each sensor may be passive or active, with or without battery. In conventional systems, the reader and the RFID tags are generally required to be in close proximity so that the tags can operate in close proximity to the reader antenna. The limited transmission distances available with conventional RFID systems limits their use in an automated factory setting, and/or in an indoor wireless environment. Even within in the designed range of operation, such systems often have low reliability due to interferences and collisions.

If an RFID system covers a large enough area, multiple base stations may be necessary to provide adequate coverage for the area. In addition, bandwidth usage may be high because the base station computer must communicate with and process information from every radio tag within its operational range. The lack of available bandwidth limits the ability of a base station interacting with more than one radio tag at any given time.

What is needed is an RFID system without such limitations.

SUMMARY OF THE INVENTION

A method for deriving information from an RFID tag may include transmitting RFID tag interrogation signals from an antenna, such as an array of antenna elements, to an RFID tag, processing the signals received by each of the antenna elements from the RFID tag to alter relative phase between the signals received therefrom and deriving information from the RFID tag from a combination of the processed received signals. Processing the signals may include selecting signals from one of the antenna elements as a reference signal, adjusting the relative phase of the signals from each of the other antenna elements relative to the reference signal and combining the reduced relative phase signals with the reference signal to form a combination signal having a higher gain than the signals from any one of the antenna elements.

Combining the signals may include autocorrelating the reference signal, correlating each of the signals from the other antenna elements with the reference signal, separately accumulating the correlation results, delaying the signals received from each of the antenna elements to compensate for accumulation delay and applying the accumulated correlations from each of the antenna elements as a beam forming coefficient to the delayed signals received by that antenna element to produce beam steered signals from each of said the antenna elements. The signals may be correlated by conjugating the signals. The autocorrelation of the reference signal provides a measure of the absolute magnitude of the reference signal.

The RFID tag information may be derived by combining the beam steered signals and detecting the RFID tag information from the combined beam steered signals. The interrogation signals from each of the antenna elements may include a predetermined pattern and detecting the RFID tag information may include detecting the predetermined pattern from the combined beam steered signals and then detecting the RFID tag information from a portion of the beam steered signals having a predetermined relationship to the detected predetermined pattern.

Selecting the reference signal may include processing the signals from each of the antenna elements to determine the relative magnitudes of the signals and selecting the signal from the antenna element with the highest relative magnitude as the reference signal.

The method may include transmitting second RFID tag interrogation signals at a second frequency to derive RFID tag information and/or iterating the transmitting, processing and deriving to further reduce the relative phase. Processing the signals may include estimating the relative phase difference between the signals from each of the other antenna elements and the reference signal and deriving the relative range from each of the antenna elements to the RFID tag in accordance with the altered phase delay difference for each such antenna element. The location of the RFID tag may be derived from the relative ranges for each such antenna element.

Processing the signals may include deriving the relative phase difference between the signals from each of the other antenna elements and the reference signal and deriving relative direction of arrival of the received signals from the RFID tag at each of the antenna element. The relative direction of arrival information of signals from the RFID tag at each antenna element of a second array of antenna elements in response to second interrogation signals transmitted by the second array may be derived and the location of the RFID tag may be determined by combining the relative direction of arrival information derived from signals received at each array.

The transmitting, processing and deriving may be iterated to improve accuracy of relative direction of arrival information derived from the signals at each antenna element after the RFID tag information has been derived. The iterating may include combining the RFID tag information derived from each of a plurality of iterations to form a correlation matrix and applying an algorithm to the correlation matrix to reduce multipath effects in the direction of arrival information for each antenna element. The algorithm may be the MUSIC algorithm.

Second RFID tag interrogation signals may be transmitted at a second frequency. The relative signal phase information for signals received by at least one antenna element of the array at each frequency may be determined to derive range information and the location of the RFID tag may be determined by combining the range information with direction of arrival information.

Each antenna element may be calibrated to determine errors in relative phase for each such antenna element for one or more test signals and the processing of the signals received by each such antenna element may be corrected to compensate for such determined errors.

The array may be calibrated for interference signals received by the antenna elements from sources other than the RFID tag and the processing of the received signals may be corrected to compensate for such interference signals. The interference signals during a quite time period when signals from the RFID tag resulting from the transmitted interrogation signals are not received by the antenna elements may be detected by filtering the signals received by each antenna element with a plurality of banks of filters at different frequencies determining, for each of the antenna elements, if one or more of the plurality of banks of filters contain substantial interference signals during the quiet time period so that signals from such one or more of the plurality of filter banks can be modified to correct the processing of signals from that antenna element.

Signals for a selected RFID tag from which information is to be derived may be selected from signals from a plurality of RFID tags based on a spatial location of the selected RFID tag relative to the spatial location of other ones of the plurality of RFID tags.

A method for deriving information from an RFID tag may include steering first transmitted RFID tag interrogation signals from an array of antenna elements to a first RFID tag, steering second transmitted RFID tag interrogation signals to a second RFID tag, processing signals received by each of the antenna elements from the RFID tag in response to the first and second RFID tag interrogation signals and deriving information from the first and second RFID tag from the processed received signals. The signals received in response to at least one of the transmitted RFID tag interrogation signals may be processed by beamforming to reduce effects of interference in the signals and/or to maximize a ratio of the signals received from the RFID tags compared to interference and noise.

The method may include transmitting third RFID tag interrogation signals to a third RFID tag at a different time than the first RFID tag interrogation signals were transmitted and discriminating signals received from the third RFID tag from signals received from the first RFID tag in accordance with the time difference. The method may also or alternately include transmitting a third RFID tag interrogation signals to a third RFID tag at a different frequency than a frequency at which the first RFID tag interrogation signals were transmitted and discriminating signals received from the third RFID tag from signals received from the first RFID tag in accordance with the frequency difference.

A calibration factor may be determined for each antenna element in accordance with signals received by that antenna element from a calibration signal transmitter at a known location during a calibration test and applying the calibration factor for each antenna element while processing signals received in response to the first and second RFID tag interrogation signals.

A method of deriving information from an RFID tag may include transmitting RFID interrogation signals using an array of antenna elements, processing signals received from RFID tags in response to the RFID interrogation signals with a series of CIC filters having different frequency responses and reconstructing information from the RFID tags from signals stored in the CIC filters after the signals have been received from the RFID tags. Interference may be removed from the processed signals in accordance with the different frequency responses of the series of CIC filters. The received signals may be down-converted from an RF band to an IF band in accordance with the different frequency responses of the series of CIC filters. The characteristics of a transmit/receive channel between the array of antenna elements and the RFID tags may be determined in accordance with information derived from signals received from the RFID tags over a period of time long enough to indicate channel characteristics and the signals received from the RFID tags in response to the RFID interrogation signals may be compensated for the channel characteristics in accordance with the different frequency responses of the series of CIC filters.

An RFID system may include an antenna array having a plurality of antenna elements, a digital receive processing block responsive to signals received by each antenna element to derive RFID tag information from the signals and a CIC filter in the digital receive processing block for selectively processing portions of the received signals so that the selected portions are maintained after receipt long enough to derive the RFID tag information by post processing.

The digital receive processing block may include a FIR filter providing a first level of FIR filtering for processing the received signals and applying the FIR filter processed signals to the CIC filter wherein the combination of the FIR filter followed by the CIC filter provides a second, higher level of FIR filtering with substantially less complexity than a FIR filter providing the second, higher level of FIR filtering directly. The CIC filter may remove multiple images of a desired received signal portion present in an output of the FIR filter having the first level of FIR filtering. A receive beamformer may be responsive to signals received by each antenna element to combine such received signals to produce and apply a beam steered combined signal to the digital receive processing block to derive RFID tag information from signals received from a first selected direction.

The receive beamformer may combine such received signals to apply a second beam steered combined signal to the digital receive processing block to derive RFID tag information from signals received from a second selected direction. The receive beamformer may be used to provide spatial domain multiplexing to selectively derive RFID tag information from signals received from a plurality of selected directions. The digital receive processing block may combine frequency and/or time domain multiplexing with the spatial domain multiplexing to selectively derive RFID tag information from a plurality of closely located RFID tags to selectively derive RFID tag information from a plurality of closely located RFID tags.

A dielectric loaded antenna array element may include a dielectric layer, a metallic patch supported on a first side of the dielectric layer, a ground plane layer on an opposite second side of the dielectric layer, antenna feed network connected to antenna terminals and one or more slots in the ground plane layer, coupled to the antenna feed network, for exciting the metallic patch through the dielectric layer, each slot having a narrow central section and an increased area end section at each end of the narrow central section which increases the bandwidth of the antenna element as compared to a constant width slot having the same width as the narrow central section.

The antenna array element may have four slots, two of which are each driven by one of the antenna terminals to cause circular polarization of the antenna element. The antenna element patch may be square, the slots may each be positioned generally in one corner of the square patch and shaped so that nearest edges of slots in adjacent corners are separated from each other sufficiently to achieve relatively low cross-polarization there between.

An antenna array element may include an antenna feed network connected to antenna terminals and a square metallic patch driven by the antenna feed network, each side of the patch including a slot having a first end in the center of the edge, a second end towards the center of the patch and an opening in the patch at each second end of each slot to increase the effective electrical wavelength of the antenna array element. The opening at each second end of each slot may be circular or an irregular shape.

An antenna array element may include an antenna feed network connected to antenna terminals, a metallic patch element separated from the antenna feed network by a dielectric and a pair of metallic connection elements connected between the metallic patch element and the antenna feed network, each metallic connection element having a sufficient cross sectional area so that the pair of metallic connection elements operates as a matching network for circularly polarized antenna signals.

The dielectric may be air. A multilayer printed circuit board may be included having the antenna feed network on a first layer and a ground plane on a second layer, wherein the patch element is supported about the ground plane on the second layer by standoffs so that the space between the ground layer and the patch element serves as the dielectric, and wherein each of the pair of metallic connection elements are bushings having a pin soldered at one end to the antenna feed network, the bushings screwed to the patch element at an other end. Each side of the square metallic patch may have a length and include a slot having a first width, a first end in the center of each such edge, a second end towards the center of the patch and an opening in the patch at each second end of each slot wider than the first width to increase the effective electrical wavelength of the antenna array element beyond the length of the edge.

BRIEF DESCRIPTION OF DRAWINGS

For a more complete understanding of the disclosed method and system, and the advantages thereof, reference is now made to the following description taken in conjunction with the accompanying drawings, wherein like reference numbers represent like parts, and in which:

FIG. 13 is a graphical illustration of a scattering matrix of the antenna element.

FIGS. 14a and 14b are radiation patterns for the antenna element.

DETAILED DESCRIPTION OF THE INVENTION

Figure 1:
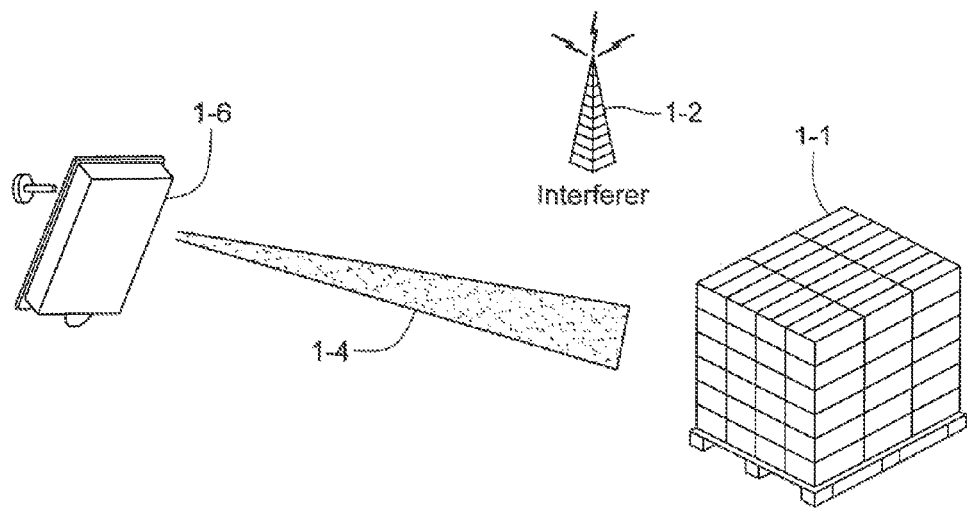
FIG. 1 is a block diagram illustrating a radio frequency identification (RFID) system.

A radio frequency identification system reader is disclosed employing an antenna array. In the forward channel, that is the transmission path between the reader and the tag, the transmit antenna array may be distributed across several physical arrays. In the case of a distributed transmit antenna, the receive antenna array may capture the impinging energy from the tag signal excited by the antenna elements of a distributed array. This approach may use spatial multiplexing to provide substantial bandwidth utilization improvements over single antenna systems. The antenna array may support multiple frequency bands. An exemplar array element design includes an aperture-coupled feed tiled patch antenna. The tiled construction includes a matrix of identical elements in a two-dimensional plane. A low-noise amplifier (LNA) may be embedded in the antenna element itself to enhance the overall performance of the system.

For cases in which a transmit array antenna is used, beam forming may be used to focus the transmitted beam to a desired location in space. This beam steering reduces the collisions and interference between the signals received from the responding tags. Various transmission policies may be adopted, as an example: the transmit beamformer coefficients may be updated every time-slot to inject a "space hopping" pattern to maximize the received isotropic power to the RFID tags, while satisfying regulatory constraints for the maximum amount of power and dwell time.

A class of filter bank, described herein as a paraunitary filter bank, may be used for both transmit and receive beam forming for processing sensors and RFID tags. The beamforming system may be decomposed into a set of lattice filters, which are inherently robust and lend themselves well to high-speed implementation with low sensitivity to quantization effects. Other classes of digital filters may be employed in place of paraunitary filter banks. The paraunitary property of the filter bank provides an effective mechanism to apply source coding, e.g. compression on the received signal. This capability can be used for real-time storage of the RF signals in the environment, while overcoming the high data rates otherwise required to record raw uncompressed waveforms from individual array elements. The output sequence from each filter is quantized to a fixed number of bits based on a-priori knowledge of the frequency shape of the wave form from the tag, which is typically defined by the standardization body. Quantization of the signal from this class of filter bank requires lower resolution (number of bits) as opposed to the unprocessed samples at the input of the filter bank. The receive beam forming algorithm may continuously process information from the channel decoder and manipulates this information to control the beam former coefficients to optimize the performance of the system. The optimization may be performed in the presence of fading, channel noise, and interferences from spurious sources and co-channel interferers emitting in the same frequency band.

Interference mitigation may be provided by interference nulling or interference excision. For interference nulling, the overall beam former creates a null in the direction of arrival (DOA) of the interferers and maximizes the power from the DOA of the desired signal. That is, the interference nulling is accomplished in the space and frequency domain. For interference excision, the interference is rejected (or excised) by the filter bank implemented in the temporal domain based on an estimate of frequency characteristic of narrow band interference occupying the same frequency band.

Through periodical calibrations, the beam former may also compensate for mismatches and imperfections of RF microwave devices in the front end (that is, between the antenna and analog-digital converters (ADCs) for the receive path and between the digital-analog converters (DACs) and the antenna for the transmit path) as well as mismatches in phase and amplitude from RF-to-baseband from multiple independent parallel array element paths.

Presently, only temporal and spectral separation is used to separate each reader signal as to minimize the interference. The separation of signals may be extended by the array system to include temporal, spectral as well as spatial to maximize bandwidth efficiency. With judicious cell planning for a collection of readers within a confined space, it becomes possible to substantially increase frequency reuse and the overall throughput of the system (e.g. number of tag reads per second).

The element design of the antenna array may be used for both transmit and receive operation.

An RFID system may include the antenna array, transmit beam former, receive beam former and the digital signal processing subsystem. The antenna array may be implemented with a modular wideband patch element with integrated low noise amplifier. The transmit beam former may be implemented with a paraunitary lattice filter bank and low complexity cascaded integrator comb (CIC) filters. The receive signal processing block may be implemented with a paraunitary lattice filter bank, signal compression and source coding for optional off-line reconstruction and synthesis of RF signal as well as low complexity CIC decimating filters. The transmit beam former may be optimized using adaptive beam forming while the receive beam former may be optimized using interference nulling and/or cancellation, optimization of signal to interference and noise ratio (SINR) using a subspace projection technique such as single value decomposition (SVD) as well as estimation of the direction of arrival (DOA) of the signals.

The antenna element may includes circular polarization, a feeding network, matching circuit, dielectric patch element, conductive loops connecting the radiating element and the low noise amplifier. A plurality of both reactive components and mutual coupling between the feeding elements and power amplifier may be provided as well as a plurality of stacked dielectric layers and ground planes with copper conductive loops to provide a high degree of isolation between right and left polarization ports.

Referring to the drawing figures, FIG. 1 illustrates an example of an RFID reader interrogating a group of RFID tags placed on a number of inventory items depicted as arranged as a pallet. The RFID system may operate in the presence of interference from interferer 1-2. The pallet of goods 1-1 may be composed of many cases or items tagged with RFID passive tags. A transmitted interrogation signal 1-4 from an antenna 1-6 may impinge upon the pallet 1-1. In response to the signal energy detected by each, each tag may backscatter a sequence of information using the power received from the transmitted beam 1-4. In the environment, there may be man made or natural interference such as from interferer 1-2. Receive antenna array 1-6 may be used to apply beam forming to the backscatter signal from the tag so that the received power from the tag is maximized and the power received by antenna 1-6 from the interferer 1-2 is minimized.

Figure 2:
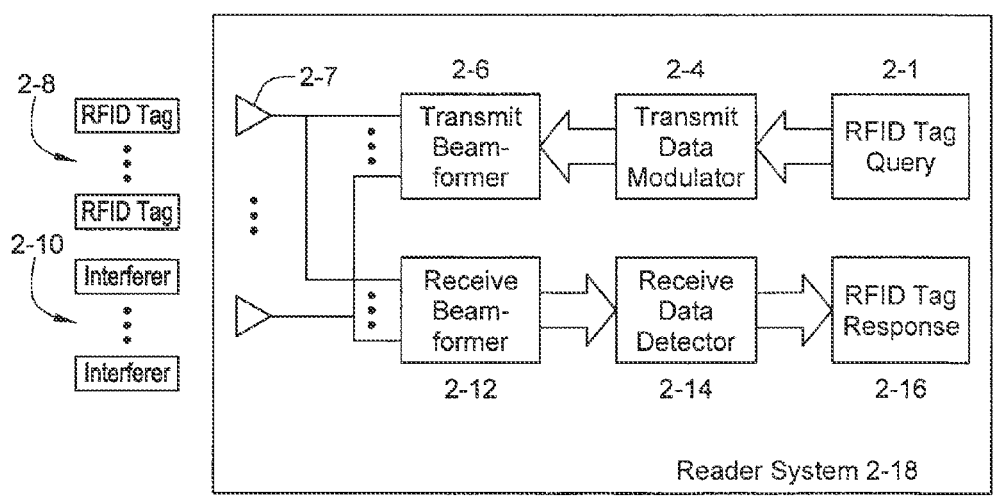
FIG. 2 is a schematic block diagram illustrating the RFID system of FIG. 1.

Referring now to FIG. 2, a functional block diagram reader 1-6 of FIG. 1 is illustrated, depicting reader 2-18 interrogating the RFID tags on pallet 1-1 in the presence of interference. Query data 2-1 for the RFID tags is modulated by the transmitter in modulator 2-4. The modulated waveform from modulator 2-4 is fed into the transmit beam former 2-6 which focuses the transmit array antenna pattern to a desired group of RFID tags 2-8 in a compact subspace of the overall read range which may include RFID tags 2-8 and interferers 2-10. Tag responses, or backscatters, are received by the receive array antenna and receive beam former 2-12 which optimize the antenna pattern to enhance the desired received signal and rejects the received interference from interferer 2-10. The received signals are processed by the receiver detector 2-14 to generate the tag response.

In RFID Tag Query 2-1, a particular tag may be queried by driving the transmitter to modulate an RF waveform in modulator 2-4 which is then applied by the transmit beam former 2-6 to excite the antenna elements 2-7, accordingly. One of the many RFID tags in 2-8 backscatters the information embedded in the tag in response to the signal transmitted by antenna elements 2-7. The received signal may be corrupted by interferers 2-10. The received signal is processed by the receive beam former 2-12 and the received data is detected in detector 2-14. The detected data is used to provide the RFID tag response 2-16.

Figure 3A:
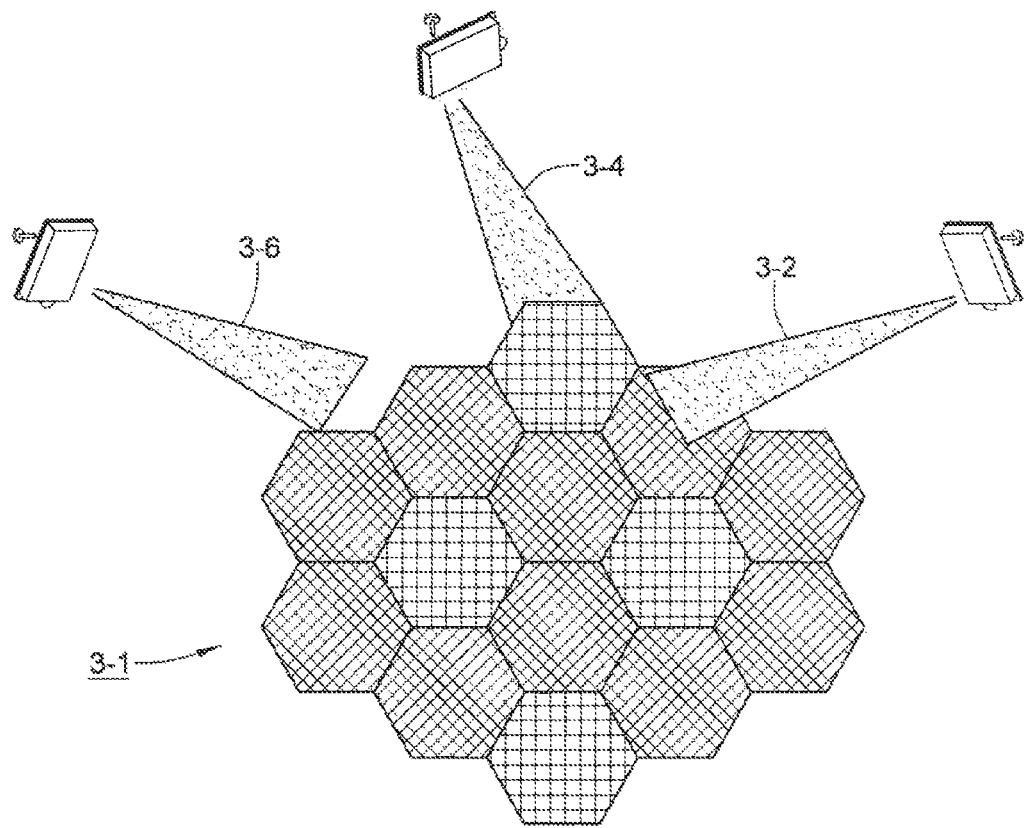
FIGS. 3A-3E are illustrations of the frequency, time and spatial domain multiplexing for the reader operation.

Referring now to FIG. 3A, Space Division Multiple Access (SDMA) techniques may be employed by multiple readers, and may be referred to herein at times as the "Dense Reader Mode". Each reader may be a beam forming transmitter/receiver, but optionally a distributed transmit array using a plurality of transmit arrays for each reader may be employed. In the dense reader mode, the beams may be concentrated so that beam forming results in exciting a small subset of tags, i.e. a smaller collision domain may be realized when multiple tags respond to the same reader inquiry. The smaller the collision domain of possible collision volume, the less likely backscatters from cells will collide e.g. be on the same frequency, at the same time or from tags close to each other (because a smaller population of tags in a particular volume are turned on at any given time). Each beam may excite a different small set of tags in widely dispersed small areas. The space may be decomposed into equally sized polygons, e.g. groups of tags or cells. A single instance of a feasible frequency assignment 3-1 is represented by the three similarly shaded patterns as shown in the figure. The three antennas 3-2, 3-4 and 3-6 beams ideally are scheduled to form both receive and transmit beams that maximize the distance (Euclidean) between active cells.

The scheduler objective may be to: a. maximize frequency re-use, b. minimize co-channel interference, c. minimize collision of tag responses in time domain, and d. maximize the number of tags read per second. This translates into enabling much more reliable reads and higher throughput in terms of number of successful tags read per second. Use cases are envisioned in which thousands of tags may be placed in a warehouse or distribution center. With use of space, frequency and time multiplexing, it may be possible to arbitrarily push the envelope in the number of successful reads per second with proper cell, frequency and time scheduling of each interrogation cycle. This effectively establishes a virtual fence around the entire space and a full inventory of the warehouse can be achieved ideally in on the order of one second or less. The cell size and SDMA interrogation cycles may be predicated by the size of the array, physical size of the location and desired target of the number of tag reads per second.

When targeting neighboring frequency cells, different frequencies with each beam allocated to a different possible frequency channel. During each timeslot, the transmit and receive beam former may form multiple, non-overlapping beams emanating from each of antennas although the antenna embodiment shown below typically supports one main beam. Multiple groups of tags, e.g. multiple cells, can be processed simultaneously from different cells. Within each beam, the group of tags may be interrogated each by either a different frequency channel, time slot, spatial cell or by combinations of all three. The subspace, slot and channel assignment policy may be selected either based on regulatory requirements or maximizing the overall system performance. Each polyhedron in FIG. 3A may correspond to a transmission schedule to a particular cell location in the space. Without loss of generality, a simple example of a case of three cells is depicted with equally spaced cells, and equal dwell time in each frequency. The beam scheduler used for the example shown in FIG. 3A may employ a hopping pattern in the "space dimension", that is the selection of each cell may be randomly made as opposed sequentially.

Referring now to FIGS. 3B-3E, various techniques can be used to read multiple RFID tags on a pallet, in a room or in some other volume. The volume may be broken up into spatial cells, for example, by dividing up the volume into equally spaced polygons as shown for example in FIG. 3A, or with a similar technique. The RFID tags within each cell may be read, separately from tags within other volumes, by using one or more readers with beam forming transmit and receive antennas. Separation of the cells for RFID purposes may be accomplished by using spatial, time and/or frequency division to distinguish the backscatter returns from tags within different cells.

Figure 3B:
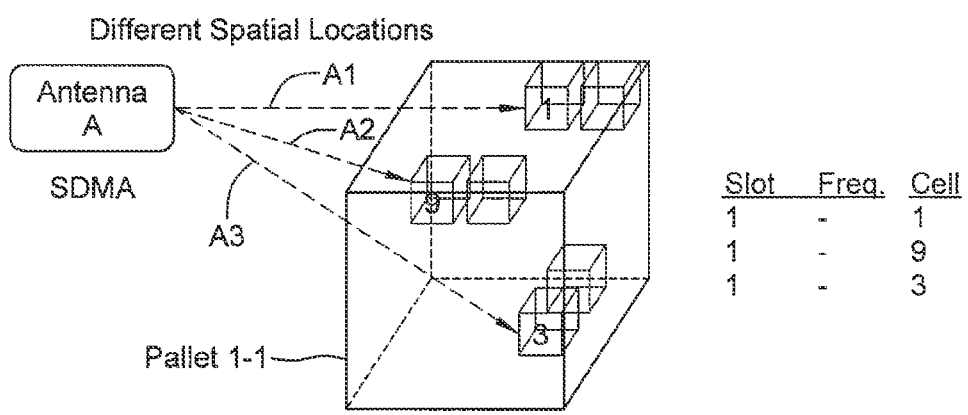

Referring now to FIG. 3B, a simple example of spatial division multiplexing is shown using reader antenna A to read tags in cells within a volume, such as pallet 1-1 shown in FIG. 1. Antenna A may transmit and receive multiple, non-overlapping beams. In this example, pallet 1-1 is broken up into a series of cells, three of which are identified for convenience as cells 1, 9 and 3. In a preferred embodiment, the entire volume of pallet 1-1 may be broken up into a series of equally sized polyhedron cells. The size of the cells for any particular volume is dependent upon many variables: such as the propagation environment, type of material the tag is attached to, the tag type and size of the physical location. In this example, antenna A is shown as forming three separate, non-overlapping beams: A1 directed to cell 1, A2 directed to cell 9 and A3 directed to cell 3. As a result of the spatial diversity of the three cells, all three can be excited and read simultaneously, without substantial loss of data by collision or interference between backscatter responses, without regard for the frequency channel being used. If two of the beams from Antenna A are directed to spatially closely located cells at the same time, it may be advantageous to use different frequency channels for the two beams, as discussed below in greater detail with regard to FIG. 3D.

In FIG. 3B, a chart is shown which illustrates the operation of a beam former scheduler which controls the slot time, frequency channel and spatial location of the beam target. In the first time period, e.g. during time slot 1, each of the three non-overlapping beams A1, A2 and A3 from Antenna A may be used to query and read a different cell, such as cells 1, 9 and 3, respectively. The number of different cells which may be separately read during any particular time slot from Antenna A is dependent upon the number of non-overlapping beams which can be transmitted and received by the antenna. As noted above, if the cells excited during the same time period are close enough so that the beams may be slightly overlapping, and/or collisions between the received backscattered query responses may occur, different frequency channels may be used. The number of frequency channels is typically dependent upon standards and/or governmental frequency allocations and restrictions.

Figure 3C:
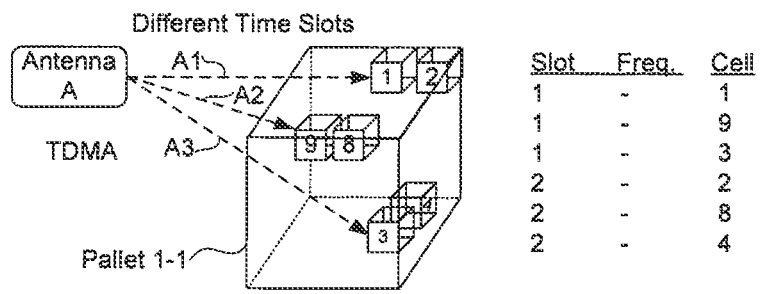

Referring now to FIG. 3C, a simple example of time division multiplexing is shown. During time slot 1, cells 1, 9 and 3 may be interrogated by non-overlapping beams A1, A2 and A3 from antenna A as described above with regard to FIG. 3A. During a subsequent period, such as time slot 2, tags in three other cells may be interrogated, e.g. during slot 2, cells 2, 8 and 4 may be interrogated by another set of non-overlapping beams A1, A2 and A3 from antenna A.

Figure 3D:
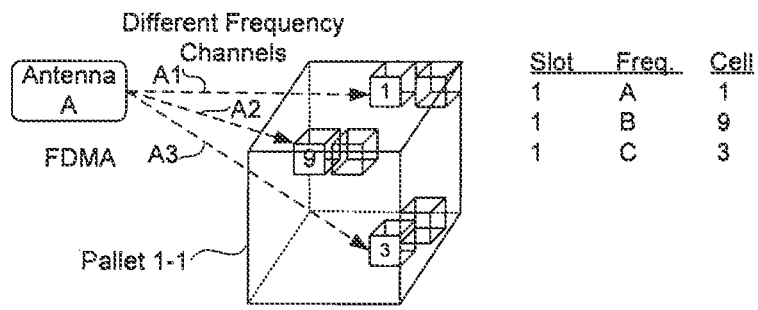

Referring now to FIG. 3D, a simple example of frequency domain multiplexing is shown in which, during one time period such as time slot 1, each of the interrogated cells may be excited at a different frequency for example by beams A1, A2 and A3 on frequency channels A, B and C, respectively.

Although this set of simple examples of multiple access provided above happen to be limited to one antenna forming three independent, non-overlapping beams using three frequency channels, the number of antennas, non-overlapping beams and frequency channels may be different in actual implementations. For example, some current RFID standards make provisions for up to 52 different frequency channels. Further, spatial, time and frequency division multiplexing techniques may be combined. As a simple example, using a single antenna with 3 non-overlapping beams and 8 frequency channels, 96 cells could theoretically be scanned in only 4 times slots, without collisions.

Figure 3E:
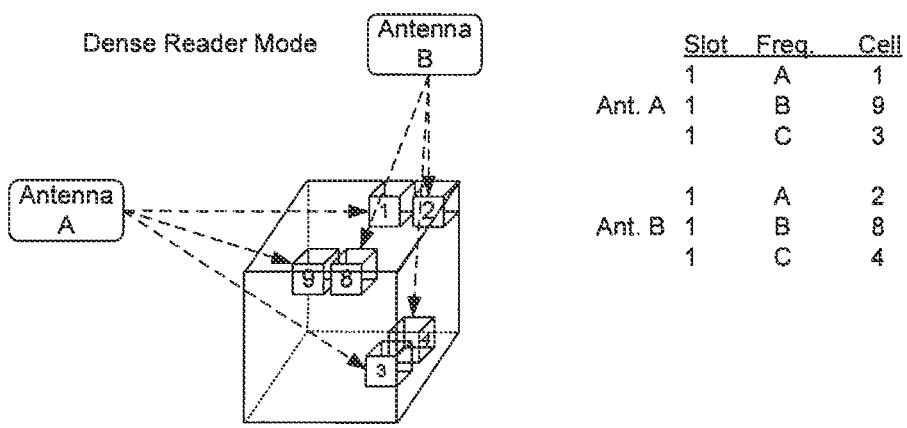

Referring now to FIG. 3E, additional antennas such as Antenna B may also be used to provide further multiplexing in what may be called a dense reader mode. Three non-overlapping beams from antenna A may be used in time slot 1 to interrogate cells 1, 3 and 9 while during the same time slot, three non-overlapping beams from Antenna B may be used to interrogate cells 2, 4 and 8. As noted above, the use of different frequencies may only be required if the cells to be interrogated are spatially close, so in other embodiments in which more beams are available than frequency channels, a greater number of cells can be interrogated by using multiple beams from the same antenna on the same frequency channel.

Rather than only using multiple antennas with multiple non-overlapping beams together with spatial, time and frequency multiplexing to maximize the number of cells that can be interrogated within a limited number of time slots, other goals may be achieved. For example, current governmental regulations limit the power, and/or duration of transmission, on frequency channels allocated to RFID and similar sensor networks. The multiplexing system may for example use frequency hopping, and/or its spatial equivalent, as well as time multiplexing to maximize the backscatter response available and keep within the limits of a limited power or transmission time regime.

Further, the size and shape of the cells may be selected to be different, and the duration of the transmissions during each slot time may be selected to be different, to further enhance the system's ability to separately interrogate tags in cells within a particular volume. An additional aspect of the multiple antenna, multiple beam and spatial multiplexing techniques is effective maximization of the overall performance of the reader networks in terms of successful tag reads per unit time.

Figure 4:
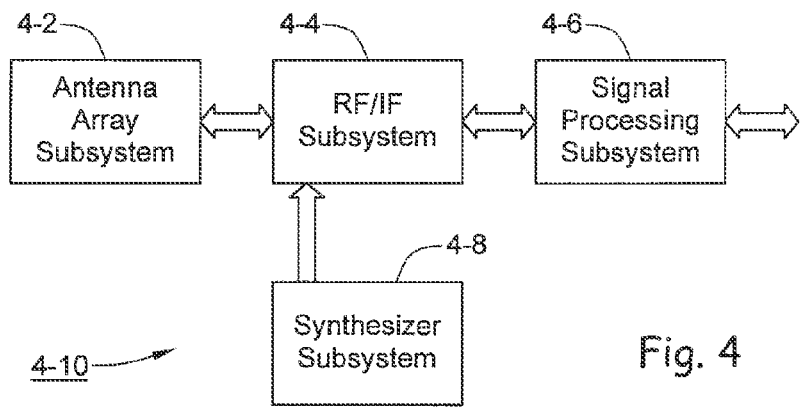
FIG. 4 is a block diagram illustrating the signal processing chain for the reader.

Referring now to FIG. 4, the hardware subsystems of the RFID system reader 2-18 of FIG. 2 are shown. The reader 4-10 may include Antenna Array Subsystem 4-2 for converting electromagnetic radiation to electrical signals, an RF/IF Subsystem 4-4 for converting these signals from an RF frequency to an IF frequency or baseband signal that can be sampled by an analog to digital converter or ADC during the receive operation and by a digital to analog converter, or DAC, during transmit operations. The RF/IF conversion in subsystem 4-4 is controlled by the Synthesizer Subsystem 4-8. The Signal Processing Subsystem 4-6 performs the beam forming, and modulation and demodulation functions.

Figure 5:
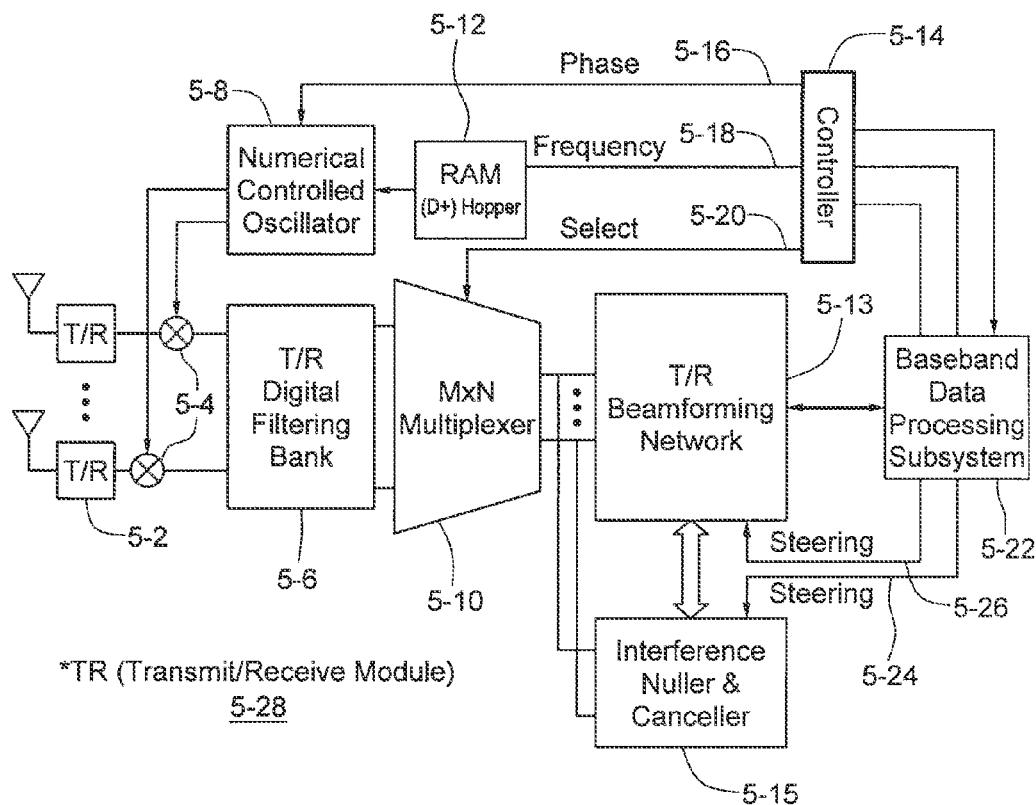
FIG. 5 is a functional architecture implemented by the signal processing chain of FIG. 4.

Referring now to FIG. 5, the functional elements of the reader hardware subsystems of reader 4-10, of FIG. 4, are shown in which the received signals are processed by the transmit/receive (TR) module 5-28. The numerically controlled oscillator 5-8 applies the appropriate phase and frequency corrections to the signals to/from each of the transmit/receive modules 5-28 by feeding the reference input to each mixer 5-4. The Transmit/Receive (T/R) Digital Filtering Bank 5-6 optimally filters the signals based on the channel characteristics, including the effects of interference. The Multiplexer 5-10 selects the frequency channels via channel control line 5-20 to be processed by the T/R beam forming network 5-13. The beam forming network 5-13 applies appropriate complex weights, which may include amplitude and phase components, to each signals associated with an array element path. The weights are determined by the Interference Nuller and Canceller 5-15. The baseband data processor 5-22 optimally modulates and demodulated the channelized data via controller 5-14. The controller 5-14 coordinates the various functions such as selecting the frequency channels 5-18 to be processed, setting the compensation phases 5-16 based on factory calibration, hopping the frequency channels stored in RAM 5-12 to meet regulatory constraints, providing steering vectors 5-26 to the beam former to focus on the appropriate direction, and provide desired setting controls to the interference nuller and canceller algorithm 5-15.

Figure 6A:
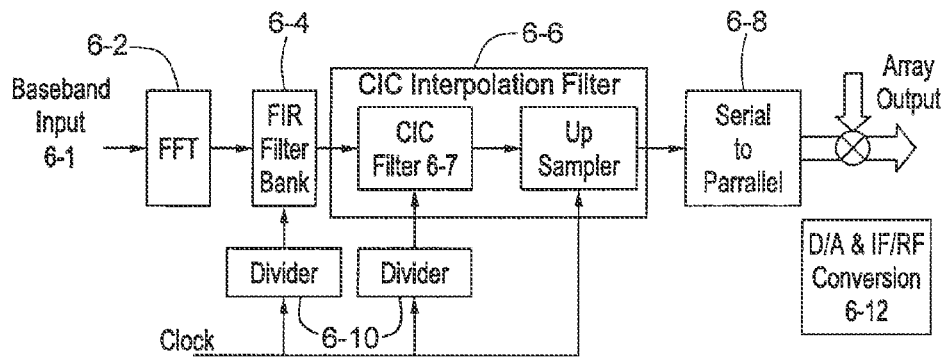
FIGS. 6A and 6B illustrate one implementation of the transmit and receive configurations of the digital filter banks of the beam former of FIG. 5.
Figure 6B:
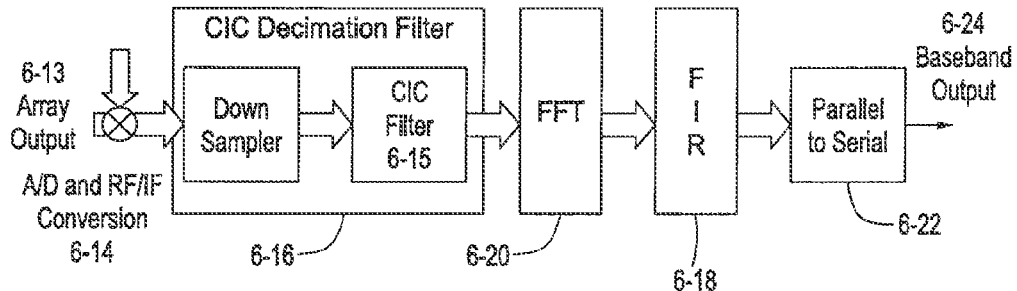

Referring now to FIGS. 6A and 6B, preferred embodiments of a filter bank channelizer implementation for transmit and for receive is shown for the digital filter bank 5-6 of FIG. 5.

Referring in particular to FIG. 6A, when configured as a transmitter, baseband inputs 6-1 are sorted into different channels by the FFT module 6-2 and filtered by finite impulse response (FIR) Filter Bank 6-4 performing the channelization function. Clock signals 6-10 are appropriately divided down and applied to FIR Filter bank 6-4. The FIR filter bank, including FFT 6-2 and FIR 6-4 for transmit, and FIR 6-18 and FFT 6-20 for receive, satisfy power complementary property and may be implemented with a set of lattice filters, such as paraunitary filters. The filtered signal from FIR filter bank 6-4 may be up-sampled by the highly efficient CIC interpolation filter 6-6 which includes a cascaded comb filter such as CIC filter 6-7 and an up-sampler. FIR filter 6-4 controls the shape of the signals in the frequency domain and CIC filter 6-7 removes unwanted images of the desired signal at other frequencies. The combination of the FIR and CIC filters permit the achievement of a narrow frequency band FIR filtering at a substantially reduced complexity and cost. The signals are then fed to each TR module via the serial to parallel multiplexer 6-8 and digital to analog and IF to RF converters 6-12.

Referring now in particular to FIG. 6B, when configured as a receiver, the receive array IF inputs 6-13 may be converted from analog to digital, and from RF to IF, signals in converters 6-14 and down-sampled in highly efficient CIC decimation filter 6-16 which includes a down converter and a cascaded comb filter such as CIC filter 6-15. The output is then fed to the FFT 6-20 which chanellizes the digital samples. The FFT 6-20 is followed by the power complementary FIR filter bank 6-18, which performs the interference excision function by blocking known interference at specific frequencies. The coefficients for the FIR filter 6-18 is derived from the signals received during the quite period of the tag interrogation cycle.

During this period, the received interference signals can be observed. The frequency domain signature of the interference is then characterized and the FIR coefficients are adjusted accordingly to remove the interference during the tag response cycle of the protocol.

Figure 7:
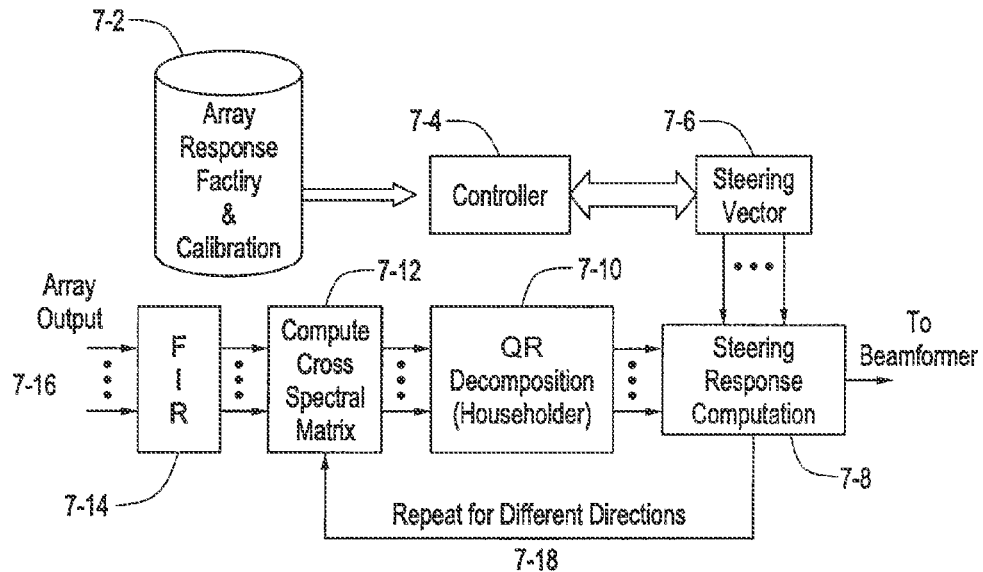
FIG. 7 is a block diagram illustrating the implementation of the interference nuller and canceller of FIG. 5.

Referring now to FIG. 7, the determination of the beam response may use a subspace projection method to optimize the quality of the signal to interference and noise ratio of the interrogation return from the RF tags. Generally, the number of signals may be determined directly by evaluating the eigenvalues of a cross spectral matrix $C=E\{y \cdot y^T\}$ where y is the received vector. That is, the transmitted signal may be modeled as:

$$x(t,\theta)=a(t,\theta)\cos(2\pi f_c t+\phi(\theta)) \quad (1)$$

for $t \in [nT_{sym},(n+1)T_{sym})$ where $T_{sym}$ denotes the symbol time interval, $a(t,\theta)$ may be a complex or real-valued information bearing signal, $\phi$ denotes the temporal phase of the transmitted signal during the symbol time and $\theta$ represents the look direction of the antenna array which in a strict sense may be considered to be a vector in a spherical coordinate system, but may be treated here simply as a scalar. In sensory networks, the transmitted and received waveforms may or may not be independent signals. Specifically, in passive RFID systems, a sinusoidal continuous waveform (CW) may be constantly transmitted to the tag for maintaining an active return link. The underlying transmitter receiver pair is shown in FIG. 1. This signal is transmitted over a communication channel with the impulse response h(t) and may be corrupted with additive white Gaussian noise (AWGN) n(t), the received signal y(t) in direction of $\theta$ may be modeled as:

$$y(t,\theta)=x(t,\theta)*h(t,\theta)+J(t,\theta)+n(t) \quad (2)$$

Here '*' represents the convolution operation, and $J(t,\theta)$ is the jamming (or unwanted interference) signal while n(t) is additive white Gaussian Noise (AWGN). If the transmitted signal from the sensor is a partially amplified version of the original signal then the impulse response is the composite impulse response of the forward and return channel, i.e. $h_f(t,\theta)*h_r(t,\theta)$. The spatial-spectral cross correlation matrix of the input signal in the discrete time can be represented as $C(\omega_1,\omega_2)$ defined in the following pair of equations:

$$C(\omega_1, \omega_2) = \sum_m \sum_l R_{y,y}(m, l) e^{-\frac{2\pi\omega_1 l}{N}j} e^{-\frac{2\pi\omega_2 m}{M}j} \quad (3)$$

$$R_{y,y}(m, l) = E[\vec{y}(t, \theta)\vec{y}(t+\tau, \theta)]\Big|_{\substack{\tau=mT \\ t=lT}} \quad (4)$$

We denote the correlation matrix $R=[R_{y,y}(m,l)], \forall m,l=1,\ldots,N]$ and $C=[C(i,j), \forall i,j=1,\ldots,K]$ where N is the number of sample points in the time domain, K is the number of sample points in the frequency domain, $c_{ik}$ denotes the i,$k^{th}$ elements of matrix c and T denotes the sampling period. Without loss of generality, in the forgoing, we only adopt the dependency on the look direction on one parameter $\theta$ for simplicity. By replacing $\theta$ with multiple angles, the results may be trivially extended to two or three dimensional antenna arrays and beam formers. Furthermore, superscript "T" is used to denote the transpose operation on matrices and vectors.

The goal of the beam former is to find a set of filters such that the signal with largest power from the desired direction of arrival is enhanced and the interference from the unwanted signal from other directions is minimized. This problem can be formulated in terms of eigen analysis. The method may be implemented in the frequency domain (see, for example, FFT block 7-14 and Cross Spectral Matrix computation block 7-12) and the optimal response for the beam former may be determined using QR decomposition 7-10, based on the Householder method. The steering vector is used to point the antenna pattern to the desired direction. In the algorithm, this changes the cross spectral matrix. The steering vector may be adjusted from the ideal by compensations derived from factory calibration. From factory calibration and real-time update of this information, the array response may be stored as shown in storage 7-2. When a specific look direction is selected by the controller 7-4, the steering vector 7-6 is retrieved from storage. The received signal 7-16 may be processed by an FFT block 7-14. The output of the FFT 7-14 may be used to estimate the cross spectral matrix 7-12. Orthogonalization of an arbitrary matrix can be realized by so called "QR" decomposition method, based on the Householder transform in block 7-10, which may be used to compute the eigenvalues of the received signal from the array, projected onto the signal subspace. These eigenvectors may be used to compute the desired steered response in computation block 7-8 to minimize the effect of the interference (that is, to provide interference nulling) while maximizing the power of the desired signal from the tag. QR decomposition may be realized by the Householder method in QR decomposition 7-10. The QR decomposition based on the Householder method in block 7-20 entails N−1 reflections, which is the matrix multiplication between the Householder matrices $\{H_k\}$ and the matrix C. After N−1 reflections the upper triangular matrix R is obtained. The multiplication product of all reflection matrices is the orthogonal matrix $Q(Q^T=Q^{-1})$ $$H_{N-1}\ldots H_2H_1=Q \quad (5)$$

with the Householder matrix:

$$H_k = I - 2\frac{v_k v_k^T}{v_k^T v_k} \quad (6)$$

where $r_{ik}$ denotes the i,kth correlation value in matrix R as defined in equation (4) and $$v_k = \frac{1}{\sqrt{2r(r+|c_{kk}|)}}[0 \ldots 0 \; c_{kk} - \psi r \; c_{kk+1} \ldots c_{kn}]^T, \quad (7)$$

$$r = \sqrt{|c_{kk}|^2 + |c_{kk+1}|^2 + \ldots + |c_{kn}|^2}, \quad (8)$$

and the parameter, $$\psi = \begin{cases} \frac{c_{kk}}{|c_{kk}|}, & \text{if } c_{kk} \simeq 0 \\ 1, & \text{Otherwise} \end{cases} \quad (9)$$

The orthogonal subspace can be divided into signal and noise subspace and the average power output is $$P(\theta) = \frac{1}{s^T(\theta)Q_N Q_N^T s(\theta)}. \quad (10)$$

Here, $s(\theta)$ is the steering vector as depicted in steering response computation block 7-8, corresponding to look direction $\theta$. The noise subspace spanned by the specific columns of the Q matrix is orthogonal to the signal direction; hence, the multiplication with the steering vector corresponding to the signal direction decreases the denominator terms. Consequently, the average power produces prominent values near source locations. Hence the direction of arrival can be estimated by finding a maximum of the above expression over $\theta$. The beam former coefficients are:

$$w(\theta)=R^{-1}S(\theta)/P(\theta) \quad (11)$$

for a given correlation matrix R in equations 3 and 4.

Figure 8:
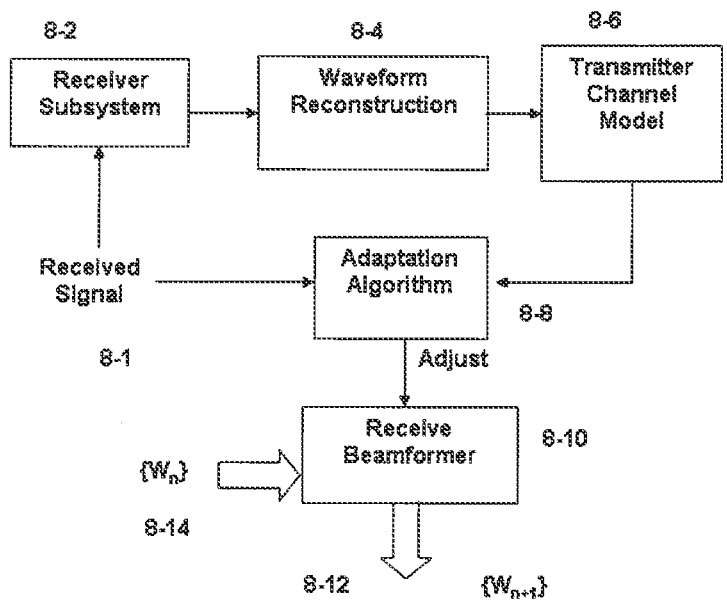
FIG. 8 is a block diagram illustrating the implementation of the data-assisted beam former of FIG. 5.

Referring now to FIG. 8, the optimal beam response determination may be data-aided. The received signal 8-1 may be demodulated in receiver subsystem 8-2 and the received data from receiver 8-2 may be used to generate a best estimate of the receive signal in waveform reconstruction subsystem 8-4 and then to reconstruct the return signal from the tag through the transmitter channel model 8-6. The received signal and the reconstructed received signal may be used in an adaptation algorithm 8-8 to update the weights of the beam former filter bank 8-10 from the weights computed from the previous update period 8-14, forming the current output weights 8-12.

Figure 9:
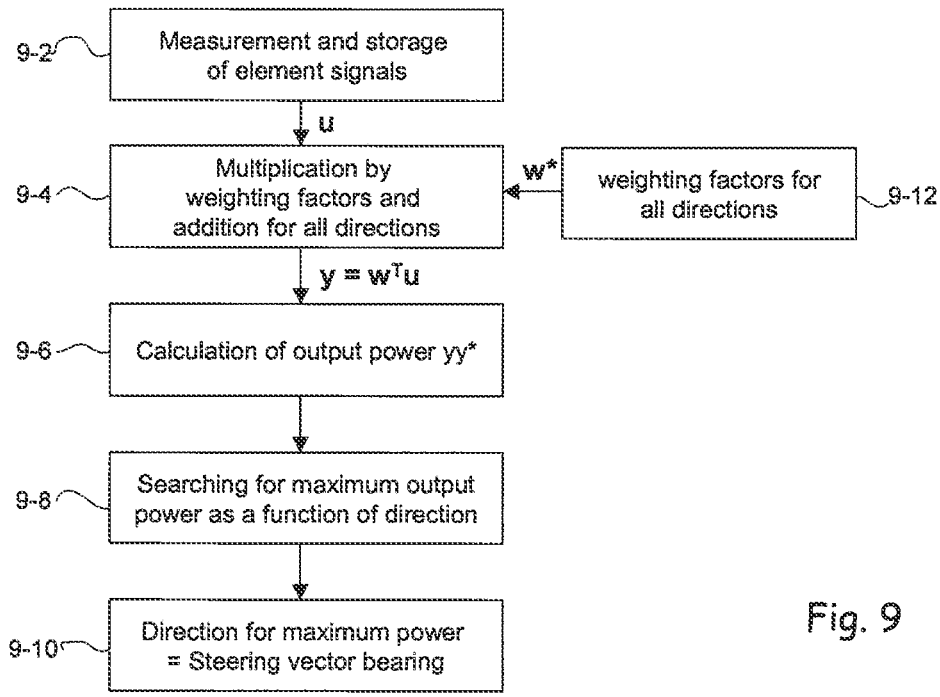
FIG. 9 is a block diagram illustrating the calibration method.

Referring now to FIG. 9, the calibration method used to generate the factory calibration database 7-2, of FIG. 7, is shown. The steering vector may be calculated for different look directions. That is, the total array pattern can be factored as the product of the element and array factor. The antenna array may be steered to a particular section of space by using the steering vector. In general, the steering vector is the product of the element factor by the array factor and can be calculated by $$S(\theta,\phi)=EF(\theta,\phi)AF(\theta,\phi) \quad (12)$$

As a function of the azimuth and elevation angles, $\phi$ and $\theta$, the element factor (EF) is fixed and the array factor (AF) may be defined by:

$$AF(\phi, \theta) = \sum_{n=1}^{N}\sum_{m=1}^{N} I_{mn}e^{j\alpha_{mn}}e^{j\xi_{mn}}. \quad (13)$$

For a rectangular N×N array and for a given direction $\phi_o$ and $\theta_o$:

$$\xi_{mn} = \frac{2\pi}{\lambda}(x'_{mn}\sin(\theta)\cos(\phi) + y'_{mn}\sin(\theta)\sin(\phi)) \quad (14)$$

$$\alpha_{mn} = -\frac{2\pi}{\lambda}(x'_{mn}\sin(\theta_o)\cos(\phi_o) + y'_{mn}\sin(\theta_o)\sin(\phi_o)).$$

$I_{mn}$ here denotes the magnitude current in element n×m. In this form the beam former coefficients are simply $w_{mn}=I_{mn}e^{j\alpha_{mn}}$. For all practical purposes, we may assume an element factory of unity, 1, in which case the steering vector reduces to that of the array factor expression. The ideal beam pattern can then be evaluated, as shown in equation, 13 by varying $\phi$ and $\theta$ for a fixed set of $\phi_o$ and $\theta_o$.

The steering vector for each direction may be measured in block 9-2 by orienting the array to a single impinging signal that comes from a known direction in a 3-dimensional rectangular (or spherical) grid, and then estimating the steering vector from the received signal. The output signal y provided by computation block 9-4 from the array, using the weighting factor w provided from weighting factor storage 9-12, can be determined, as well as the power of the signal calculated in step 9-6. The direction for the maximum powering may be determined in searching step 9-8 from searching signals from all directions and becomes the bearing of the steering vector. By comparing the steering vector direction and the location of the calibration signal, unknown complex gain can be compensated in step 9-10. In summary, the signal from each element may be stored as in step 9-2, the received signals for all the directions may be computed in step 9-4 and the power may be calculated in step 9-6. The maximum power is as function of the direction is found in step 9-8 and it is used to set the steering vector bearing in step 9-10. In step 9-12, the weighting factors for all the directions are applied as an input in step 9-4 for calculation of the output of the beamformer.

Figure 10A:
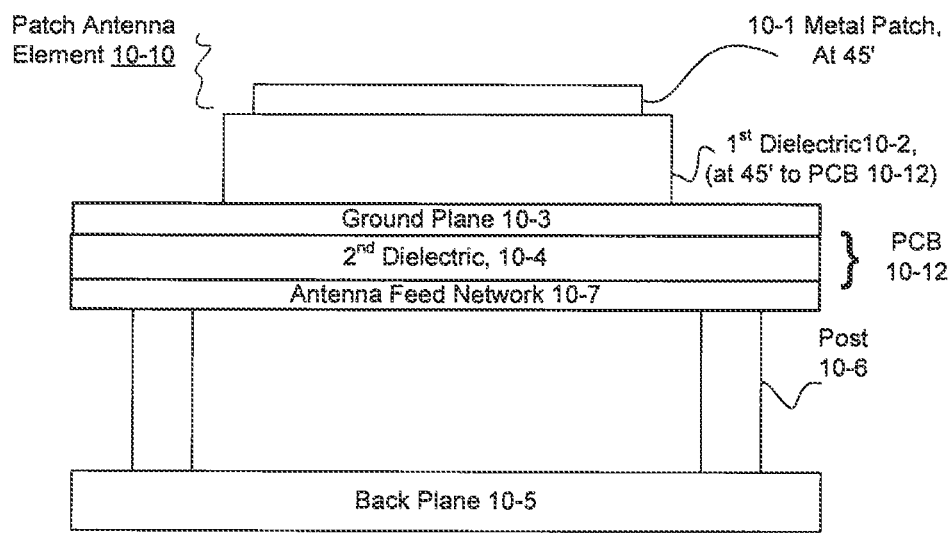
FIGS. 10a and 10b are side and top views, respectively, of a an antenna element with TMM-4 dielectric mounted on an element substrate.
Figure 10B:
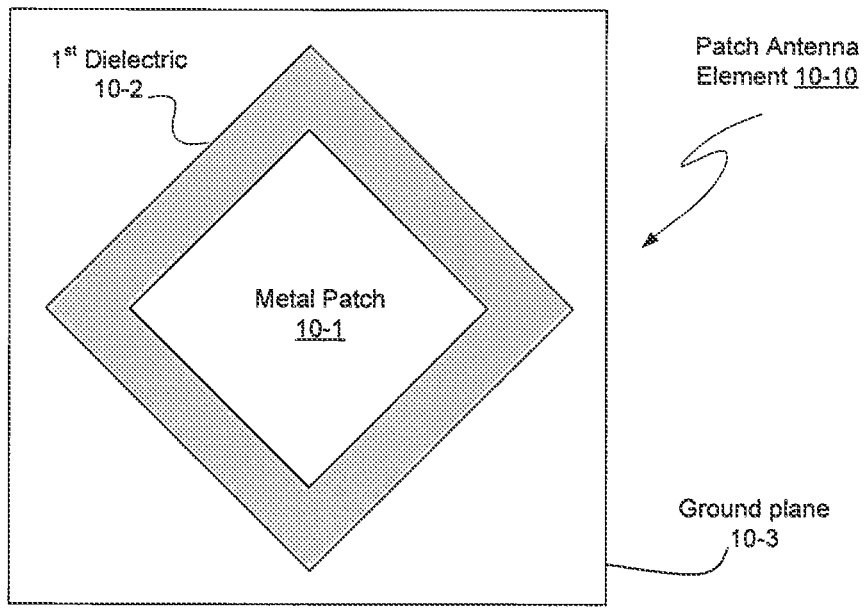

Referring now to FIGS. 10A and 10B, an aperture coupled patch antenna 10-10 is shown for use in a preferred embodiment. A square metallic patch 10-1 may be printed on the upper surface of first dielectric layer 10-2. The patch antenna 10-10, and its first dielectric layer 10-2, may be positioned at an angle of approximately forty five degrees on an upper surface of metallic ground plane 10-3 which may be the top surface of a printed circuit board such as PCB 10-12 which may include second dielectric 10-4 and antenna feed network 10-7. The resonance frequency of the antenna 10-10 depends on the size of patch 10-1, the material of first dielectric layer 10-2 and its thickness. Since a wide frequency band may be required for this RFID application, a relatively thick dielectric has been chosen for the first layer 10-2. Second dielectric layer 10-4 may be mounted on the bottom side of ground plane 10-3. An antenna feeding network 10-7 may then be mounted on a bottom surface of second dielectric layer 10-4. The ground plane 10-3 is common between the first and second dielectric layers 10-2 and 10-3. To avoid radiation from the feeding network 10-7, and to reduce potential coupling between different antenna elements through the feeding network 10-7, the back side of the antenna element 10-10 may be shielded by square metallic back plane 10-5 connected ground plane 10-3 of PCB 10-12 with metallic posts 10-6.

Figure 11:
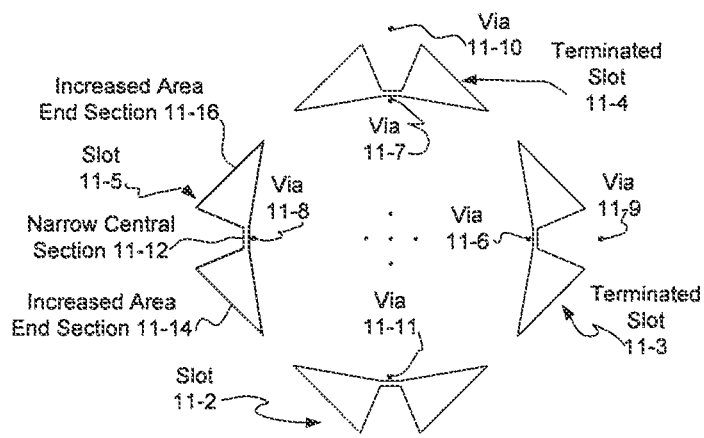
FIG. 11 is a top view of a ground plane and four slots illustrating the fabricated substrate for 900 MHz operation.

Referring now also to FIG. 11, aperture coupling techniques are preferably employed to excite the antenna element 10-10. Since a relatively thick dielectric 10-2 may be used in the first layer, the antenna 10-10 may have symmetric excitation. Four slots, 11-2, 11-3, 11-4 and 11-5, may be placed on ground plane 10-3 one the upper side as shown of PCB 10-12. Each pair of slots may excite one resonance mode of the antenna 10-10. The resultant pair of resonant modes may be orthogonal and may be used to generate circular polarization. The shape and size of these slots may be optimized for maximum bandwidth and lowest coupling between the two orthogonal excited modes. For example, slot 11-5 is in a shape which may be called a "butterfly" shape that the shape of the slot includes three sections, narrow central section 11-12 and increased area end sections 11-14 and 11-16. As a result of the increased area end sections 11-14 and 11-16, slot 11-5 has a substantially larger total area than it would if the entire slot was as narrow as narrow central section 11-12. The width of narrow central section 12 is limited by the requirement to excite metal patch 10-1. The increased total area improves the bandwidth and permits circular polarization without substantial interference between the slots. The shape of the increased area end sections 11-16 and 11-18 are dependent on the room available on the patch while limited interference between the slots. The butterfly shape shown was selected to maximize the area of the slot in each corner of the patch without having the ends of slots in adjacent corners so close together that they interfered with one another, for example by cross polarization.

Antenna feed 10-7, on the bottom side of PCB 10-12 as shown, includes excitation circuitry with microstrip lines which are connected by vias to drive the slots on ground plane 10-3. In particular, slots 11-2 and 11-5 may be excited by microstrip transmission lines which may be terminated to the ground plane 10-3 by said vias 11-11 and 11-8, respectively. These transmission lines may pass the center of slots 11-2 and 11-5 on the bottom side of the second dielectric layer and provide two linear polarized ports. Later on, these two ports may be excited by two 90° out of phase signals to generate a circular polarized radiated field. Slots 11-3 and 11-4 may be terminated by microstrip lines 12-4 and 12-5, shown in FIG. 12 below, which pass through the center of slots 11-3 and 11-4, respectively, on the bottom side of second dielectric layer 10-4. Both ends of the microstrip line 12-4 may be terminated to the ground pane by vias 11-6 and 11-9 while both ends of the microstrip line 12-5 may be terminated to the ground pane by vias 11-7 and 11-10.

Figure 12:
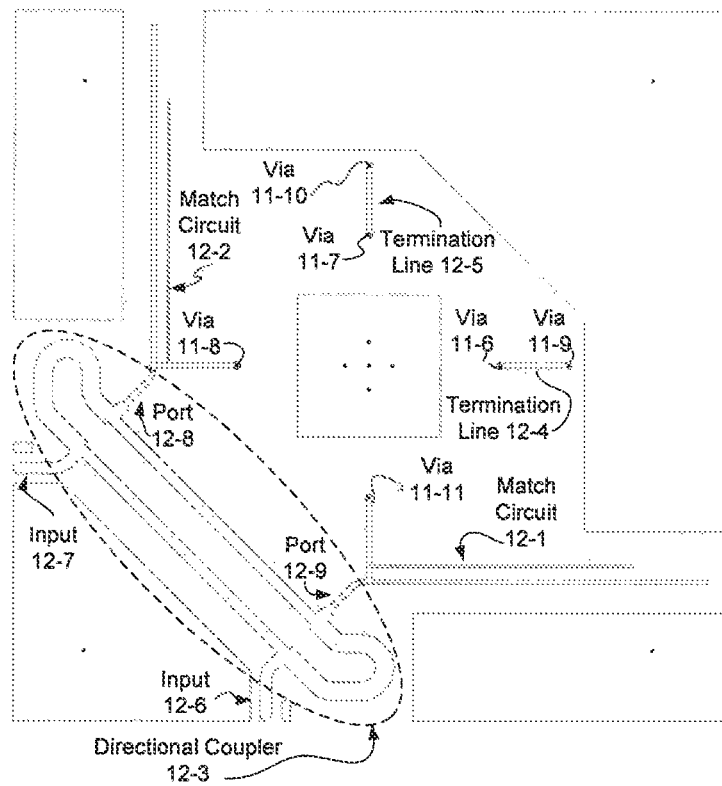
FIG. 12 is a top view of a feeding network for the antenna elements.

Referring now also to FIG. 12, feeding network 11-1 may contain matching circuits 12-1 and 12-2 to provide the element excitation at slot 11-2 and 11-5, respectively. Two open ended microstrip lines may be connected with a microstrip line and the length, and width of each section may be optimized to have a 500 impedance, to form matching circuits 12-1 and 12-2. Each of these two matching circuits 12-1 and 12-2 may generate a linear polarized field in the far-zone. These two linear polarized modes may be excited 90° out of phase to generate a circular polarized field in the far-zone. A branch line directional coupler 12-3 may be employed to provide 90° out of phase excitation for these matching circuits 12-1 and 12-2. The branch line directional coupler 12-3 may have four ports. Ports 12-8 and 12-9 may be connected to the matching circuits 12-2 and 12-1, respectively and ports 12-6 and 12-7 may be connected as input ports. The branch line coupler 12-3 may be printed on the bottom side of second dielectric layer 10-4 and the length and width of each arm of the coupler may be optimized to have maximum bandwidth in the input impedance and high isolation between ports 12-6 and 12-7. The antenna element 10-10 may be used in a phased array with double circular polarization at the ISM band (902 MHz to 928 MHz) in a preferred embodiment. The antenna element 10-10 may transmit either right hand circular polarization (RHCP) or left hand circular polarization (LHCP)

depending on which port (12-6 or 12-7 is used for transmission. The second port can be used for receiving the other circular polarization.

Referring now to FIG. 13, graph 1 shows the scattering matrices 13-1, 13-2, and 13-3 for the $s_{11}$, $s_{12}$, and $s_{22}$ modes, respectively, of the two port antenna element 10-10 described above. These results indicate that the antenna 10-10 has good impedance matching at both ports in the entire frequency band of interest for the RFID application described herein and high isolation (more than −30 dB) between 0.910 GHz and 0.920 GHz.

Referring now to FIGS. 14a and 14b, the co-polarized and cross-polarized radiation patterns of the antenna 10-10 are shown when port 12-6 is excited and port 12-7 is terminated to the 500 load. FIG. 14a shows that the antenna 10-10 has a low cross-polarization. If a right hand circular polarization is used for transmit and a left hand circular polarization is used for the receive side, this isolation may help to eliminate the need to use a circulator which introduces additional losses for separating the left and right hand polarization. FIG. 14-b depicts the antenna element radiation pattern. A wide beam far-field pattern provides the opportunity to have a wide scanning phased array.

Figure 15:
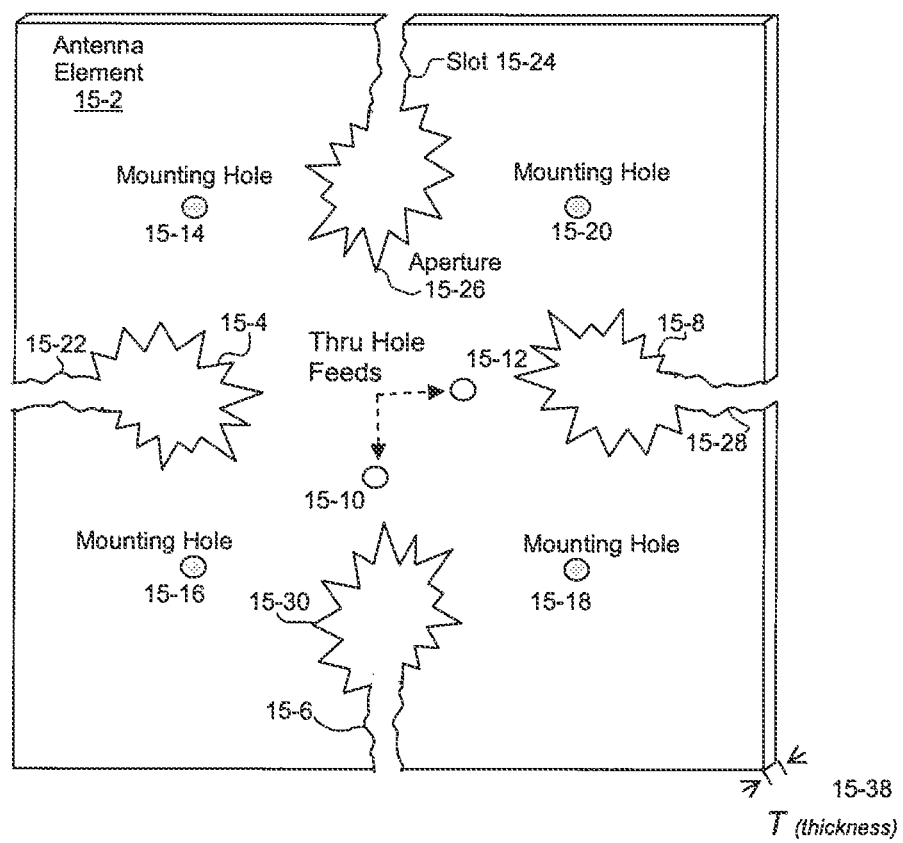
FIG. 15 is a diagram illustrating a miniature antenna element design using, air as an dielectric, with a arbitrary cutouts.
Figure 16:
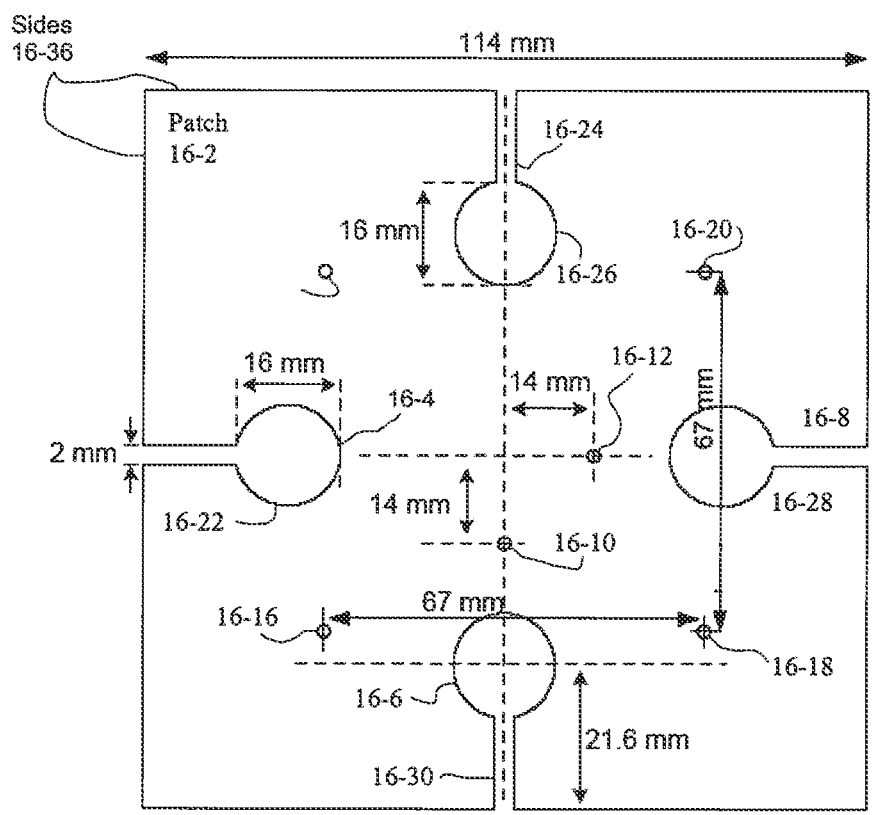
FIG. 16 is a diagram illustrating an exemplar miniature antenna element design using, air as a dielectric, for the 900 MHz band.
Figure 17:
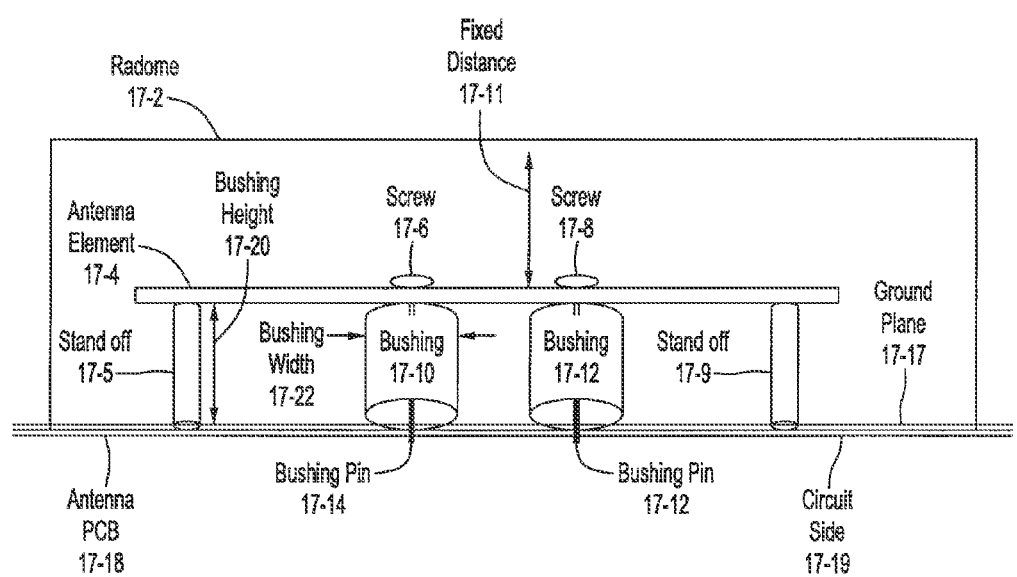
FIG. 17 is a diagram illustrating an exemplar miniature antenna element cross-view showing the bushings for transmit and receive ports at 900 MHz.

Referring now also to FIGS. 15-17, a miniature wideband circularly polarized antenna patch design may be enabled at lower frequencies, such as 900 MHz, using air as the dielectric. An appropriate antenna design meets the polarization, bandwidth and port isolation requirements for a particular system. Antenna performance may be achieved through design optimization of cut-outs on the patch. Additionally, the wide band, circularly polarized aperture coupled antenna patch design may use the feeding network and custom slots disclosed below. These antennas may be used for phase array antenna applications.

Patch Antenna design is a function of required frequency, bandwidth, dielectric material, and polarization. The size and form factor of the patch is also dependent on these parameters. The lower the frequency the larger the patch will be, for a fixed dielectric constant. The design approach described in FIGS. 15-17 may provide the capability of developing a miniature circularly polarized antenna patch with air as a dielectric.

There are several ways to miniaturize patch antennas with air as the dielectric. In one approach, the electrical current path in the antenna is lengthened. As a result, the electric length of the patch is effectively increased while maintaining the same physical length or size of the patch. In one embodiment, this may be achieved with two slots located at both edges of the patch, which force the current to go through a longer path. Increasing the length of the slots may reduce the resonant frequency and bandwidth of the antenna patch. This embodiment may miniaturize the antenna while maintaining the wide bandwidth. Additionally it may maintain the circular polarization. Circular polarization may be achieved using two orthogonal modes with 90° out of phase excitation.

In a preferred embodiment as shown in FIGS. 15 and 16, a narrow slot may be used in the metal radiation element, beginning at the center of an edge or side of the element or patch, leading toward center of the patch. The end of the slot toward the center of the patch may have an arbitrary shaped opening or cut out, larger in area than the same length of the slot, to increase the effective wavelength of the edge of the path. To achieve circular polarization, the antenna patch may be a square, with four slots starting at the center of the edges of each side of the patch. Each pair of slots are associated with one mode, and all the slots are of at least generally the same, or identical, shape including the cut out.

The wide bandwidth of antenna may be achieved by separating the active portion of the antenna element from the ground plane. The arrangement of the feeding probes (e.g. length and thickness), which connect the feeding network to the antenna, may be optimized for the required bandwidth and matching circuitry.

An aperture coupling technique may provide a wider bandwidth. The coupling may be accomplished by placing a slot in the ground plane of the patch antenna and exciting the slot with a microstrip line. Conventional aperture coupled antenna patch designs are typically limited by low bandwidths and high coupling between the two ports (i.e. low isolation). The shape and configuration of the slot may be critical to achieving a wide bandwidth. The coupling may be accomplished by placing a slot in the ground plane of the patch antenna and exciting the slot with a microstrip line. The shape and configuration of the slot may be critical to achieving a wide bandwidth.

In one approach, a dielectric patch is used. The upper surface of dielectric layer may be copper plated (i.e, metallic). The patch may then be positioned on a square ground plane e.g. on a two sided PCB. The excitation slots may be under the patch on the ground plane. The slots may provide the aperture coupling. Additionally, the thickness of the dielectric may define the bandwidth, by reducing the stored energy around the antenna, while increasing the radiated power, which results into wider antenna bandwidth. The slot may of different shapes and dimensions. The shape and size of these slots may determine bandwidth and coupling between the two ports, as well as polarization of the antenna. In a preferred embodiment, wide bandwidths may be achieved as well as high isolation between the two ports, through the special design of the four slots, which may be placed at the four corners of the patch.

In a preferred embodiment, a low cost miniature antenna patch using air as dielectric may be used. The antenna may utilize materials such as aluminum, copper and or brass for the antenna patch. The miniaturization of the patch, while using air as a dielectric, may be achieved using four specific cut-outs or apertures on the patch. This maintains the required electrical field properties on the patch, while reducing the physical size.

The aperture coupled design may use four identical slots for aperture coupling. The slots may be on the ground plane at the four corners under a dielectric such as ceramic. The upper surface of the dielectric layer may be metallized by for example copper plating. The ceramic patch may then be positioned on a square metallic ground plan, for example at a 45° angle, with respect to the corners.

A thick dielectric patch may generate non-uniform and distorted modes under the patch. This would cause high cross polarization. To keep cross polarization low, the patch may be fed through a balanced feeding network using two slots for each mode. Also, if opposite side slots are excited with 180° out of phase current, the patch may have balanced single mode excitation. Additionally, if the opposite side slots are shorted to an appropriate load and only one side gets excited, it may generate a balanced excitation.

To generate a circular polarization a pair of slots may be added to the design with 90° mechanical rotations. Slots may be provided at each corner of the patch. Each pair of slots may be excited to generate two orthogonal modes. A branch hybrid may then be used to provide a 90° out of phase excitation for each mode, which results to a circular polarization field in the far-zone.

A two sided square PCB board may be used, where one side of the board may have four slots, one under each of the four corners of a ceramic patch, through which the aperture coupling may be achieved. The feed network may be on the back side of the ground plane when a multilayer PCB is used. The feed network may contain a layer of microstrip lines on the bottom side of the second dielectric, and the four slots on the other side which may be the ground plane. The slots may be excited by microstrip transmission lines which are terminated to the ground plane by vias or plated through holes. The shape and size of the slots may be optimized for maximum bandwidth and lowest coupling between the two orthogonal, left and right hand, ports. These transmission lines pass through the center of the slots and provide two linear polarized ports.

Referring to FIGS. 15, 16, & 17, an aperture coupled patch antenna element is depicted employing air as a separator or dialectic between antenna patch element 17-4 and ground plane 17-17 shown in FIG. 17. The antenna patch element 15-2, shown in FIG. 15, may be fabricated using brass, copper or aluminum plate which may have four slots 15-6, 15-22, 15-24 and 15-28, each of which ends with an relatively large hole 15-30, 15-4, 15-26 and 15-8, near the center of plate element 15-2. The shape of the hole and slot may be arbitrary. FIG. 16 shows an example with circular apertures or cut outs, while FIG. 15 shows a design with irregular shaped apertures. The cut-out adds to the effective electric wavelength of each side of the patch, allowing the physical size of the patch to be reduced.

Referring now in particular to FIG. 16, an exemplar square antenna element or patch 16-2 suitable for operation in the 900 MHz band is shown. Slot 16-24 runs from the center of edge 16-42, which may be 114 mm long, to circular aperture 16-26 which may have a diameter of 16 mm and be positioned 21.6 mm from edge 16-42. Slots 16-28, 16-30 and 16-22 may run from the center of each of the remaining sides of patch 16-2 to circular apertures 16-8, 16-6 and 16-4. Mounting holes 16-14, 16-16, 16-18 and 16-20 may be spaced at the edges of a square, at 67 mm spacings, and centered on patch 16-2. Feed slots 16-10 and 16-12 may be positioned along the axes of slots 16-30 and 16-28, respectively at 14 mm from the center of patch 16-2. The operating frequency of antenna element 16-2 may be also be determined by the 15-38 of the plate, the height 17-20 and width 17-22 of bushings 17-10 and 17-12 as well as the shape and area of apertures 16-20, 16-8, 16-6 and 16-4.

Referring now in particular to FIG. 17, antenna element 17-4 may be a metal plate in the form of patch 15-2 or 15-4 and is secured to PCB 17-18 using plastic standoffs (two of which are shown as standoffs 17-5 and 17-9). The standoffs are secured with using mounting screws through mounting holes 15-16, 15-18, 15-20 and 15-14. Bushing pins 17-12 and 17-14 are soldered at one end to circuit side 17-19, similar in operation to the circuit shown in FIG. 12, of PCB 17-18. The other end of bushing pins 17-14 and 17-16 is affixed by screws 17-6 and 17-8 to antenna element 17-4 through through-hole feeds 15-10 and 15-12. Antenna element 17-4 may be covered using radome 17-2 at a fixed distance 17-11 above antenna element 17-14.

It is important to note that this design provides a miniature antenna element design which uses air as a dielectric. The multiple arbitrary cut out shapes, with excitation slots to match electric field requirements make the small size of this wide band circularly polarized element possible. Bushings are used for feeding the right and left hand polarization and the size and shape of these slots are optimized for maximum bandwidth and lowest coupling between the two orthogonal, left and right hand ports.

Referring now to FIGS. 18 to 22, preferred embodiments of an RFID system reader employing an antenna array is disclosed. In the forward channel, that is the transmission path between the reader and the tag, the transmit antenna array may be distributed across several physical arrays. In case of distributed transmit antenna, the receive antenna array may capture the impinging energy from the tag signal excited from the set of distributed antenna, which supports spatial multiplexing to provide substantial bandwidth utilization improvements over single antenna systems.

For cases in which a transmit array antenna is used, beamforming may be used to focus the transmitted beam to a desired location in space. This beam steering may reduce the collisions and interference between the signals received from the responding tags. Various transmission policies may be adopted, as an example: the transmit beamformer coefficients may be updated every time-slot to inject a "space hopping" pattern to maximize the received isotropic power to the RFID tags, while satisfying regulatory constraints for the maximum amount of power and dwell time.

A class of filter bank, described herein as a paraunitary filter bank, may be used in conjunction with both transmit and receive beamformers for processing sensors and RFID tags. The filter bank may be used to provide signal processing in the frequency domain; the main function in the receive direction may be to reject unwanted interferences. The filter bank may be decomposed into a set of lattice filters, which are inherently robust and lend themselves well for high-speed implementation with low sensitivity to quantization effects. Other classes of digital filters may be employed in place of paraunitary filter banks. The paraunitary property of the filter bank provides an effective mechanism to apply source coding, i.e. compression on the received signal. This capability can be used for real-time storage of the RF signals in the environment, while overcoming the high data rates otherwise required to record raw uncompressed waveforms from individual array elements. The output sequence from each filter is quantized to a fixed number of bits based on a-priori knowledge of the frequency shape of the waveform from the tag, which is typically defined by the standardization body. The quantization of the signal from this class of filter bank requires lower resolution (number of bits) as opposed to the unprocessed samples at the input of the filter bank. The stored data samples may be processed off-line by more sophisticated computing assets and/or advanced algorithms.

The receive beamforming algorithm continuously processes information from the received channelized signal samples and manipulates this information to control the beamformer coefficients to optimize the performance of the system. The optimization may be performed in the presence of fading, channel noise, and interferences from spurious sources and co-channel interferers emitting in the same frequency band.

Interference mitigation may be provided by interference nulling or interference excision. For interference nulling, the overall beamformer creates a null in the direction of arrival (DOA) of the interferers and maximizes the power from the DOA of the desired signal. That is, the interference nulling is accomplished in the space and temporal domain. For interference excision, the interference is rejected (or excised) by the filter bank implemented in the temporal domain based on an estimate of frequency characteristic of narrow band interference occupying the same frequency band.

Through periodical calibrations, the beamformer may also compensate for mismatches and imperfections of RF microwave devices in the front end, that is, between the antenna and analog-digital converters (ADCs) for the receive path and between the digital-analog converters (DACs) and the antenna for the transmit path—as well as mismatches in phase and amplitude from RF-to-baseband from multiple independent parallel array element paths.

Presently, only temporal and spectral separation is used to separate each reader signal as to minimize the interference. The separation of the signal is extended by the array system beyond conventional temporal and spectral separation into separation in the "spatial" domain to provide an added dimension in maximizing bandwidth efficiency. With judicious cell planning for a collection of readers within a confined space, it becomes possible to substantially increase frequency reuse and the overall throughput of the system (i.e. number of tag reads per second).

Important aspects of the RFID system include the antenna array, transmit beamformer, receive beamformer, and the digital signal processing subsystem. The antenna array may be implemented with a modular wideband patch element with integrated low noise amplifier. The transmit signal processing block may be implemented with a paraunitary lattice filter bank and low complexity CIC interpolating filters. The receive signal processing block may be implemented with a paraunitary lattice filter bank, signal compression and source coding for optional off-line reconstruction and synthesis of RF signal as well as low complexity Cascaded Integrator Comb (CIC) decimating filters. The transmit beamformer may be optimized using adaptive beamforming while the receive beamformer may be optimized using interference nulling and/or cancellation, optimization of Signal-to-Interference-and-Noise Ratio (SINR) using Single Value Decomposition (SVD) method as well as estimation of the direction of arrival of the signals.

A method of real-time array calibration for beamforming networks in application of RFID Systems is disclosed for use in the presence or absence of interference.

With the beamformer, another dimension of multiplexing may be exploited by an RFID system using Space Division Multiple Access (SDMA). A method of increasing RFID system throughout using a scheduler that controls the slot time, frequency channel and spatial location of the beam target is disclosed.

Implementation approach to beamforming disclosed herein also includes an optimal beamformer in which the beamforming coefficients are determined by searching over all possible combinations of the coefficients to find the one that maximizes the power of the beamformed output. A low complexity sub-optimal blind beamformer with performance approaching that of the optimal beamformer is also disclosed.

The RFID system disclosed may be used to locate an RFID tag. A method is disclosed which is based on differential range measurements. In another method disclosed, which is tolerant to multipath effects, is based on estimating DOA using the Multiple Signal Classification (MUSIC) algorithm with spatial filtering. From multiple DOA measurements, an RFID tag may be located. Another method to locate an RFID tag is from the DOA of the tag signal and its range from the reader. A range measurement technique from the difference of 2 phase measurements of a tag transmitting at two different channel frequencies is disclosed.

Figure 18:
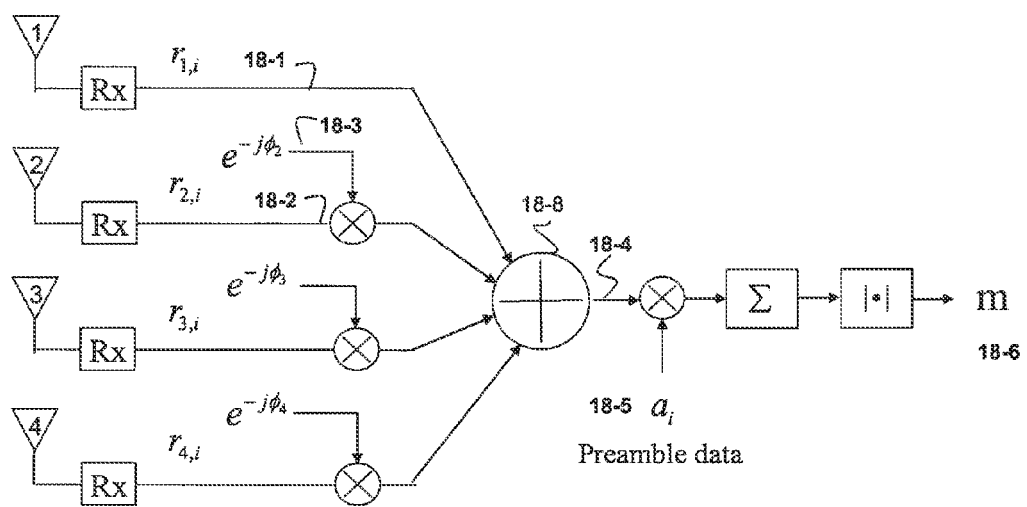
FIG. 18 is a block diagram illustrating the operation of an optimum beamformer.

Referring now to FIG. 18, another embodiment of a receive beamformer of the disclosure in FIGS. 7 and 8. This is implemented as an optimized beamformer that maximizes the power of the beamformed signal over the set of beam-weights. For illustration simplicity, first assuming the received power per each element is the same, this is depicted as a 4-element linear array although it would be obvious to the practitioner of the field that it is equally applicable to arbitrary array configurations and unequal received power per element. Here, the received signal 18-1 from array element 1 may be arbitrarily chosen, or chosen based on magnitude, as the reference signal with a weight of unity. Signals from other elements, such as signals 18-2 from element 2 are weighted by a complex coefficient 18-3. The sum of all weighted elemental signals 18-4, at the output of adder 18-8, is the beamformed signal to be processed downstream. In one implementation embodiment, the beamformed signal is correlated with the preamble data 18-5. In that case the magnitude of the correlator output 18-6 is given by $$m = \left| \sum_i a_i(r_{1,i} + r_{2,i}e^{-j\phi_2} + r_{3,i}e^{-j\phi_3} + r_{4,i}e^{-j\phi_4}) \right| \tag{15}$$

The magnitude of the correlator output is an indication of how well the beamformer performs. If the phase space for each $\phi_j$ (for example 18-3) is quantized to q values, then the optimal beamformer weights can be obtained by searching for the maximum of m over the $q^3$ possible discrete phase combinations. For the unequal power case, the inputs to the adder 18-8 should be weighted by estimated amplitudes of received signal per element before combining. This can be done by taking the magnitudes of the received signals per antenna element and accumulate. This operation is not shown in FIG. 18 for the unequal power case.

Figure 19:
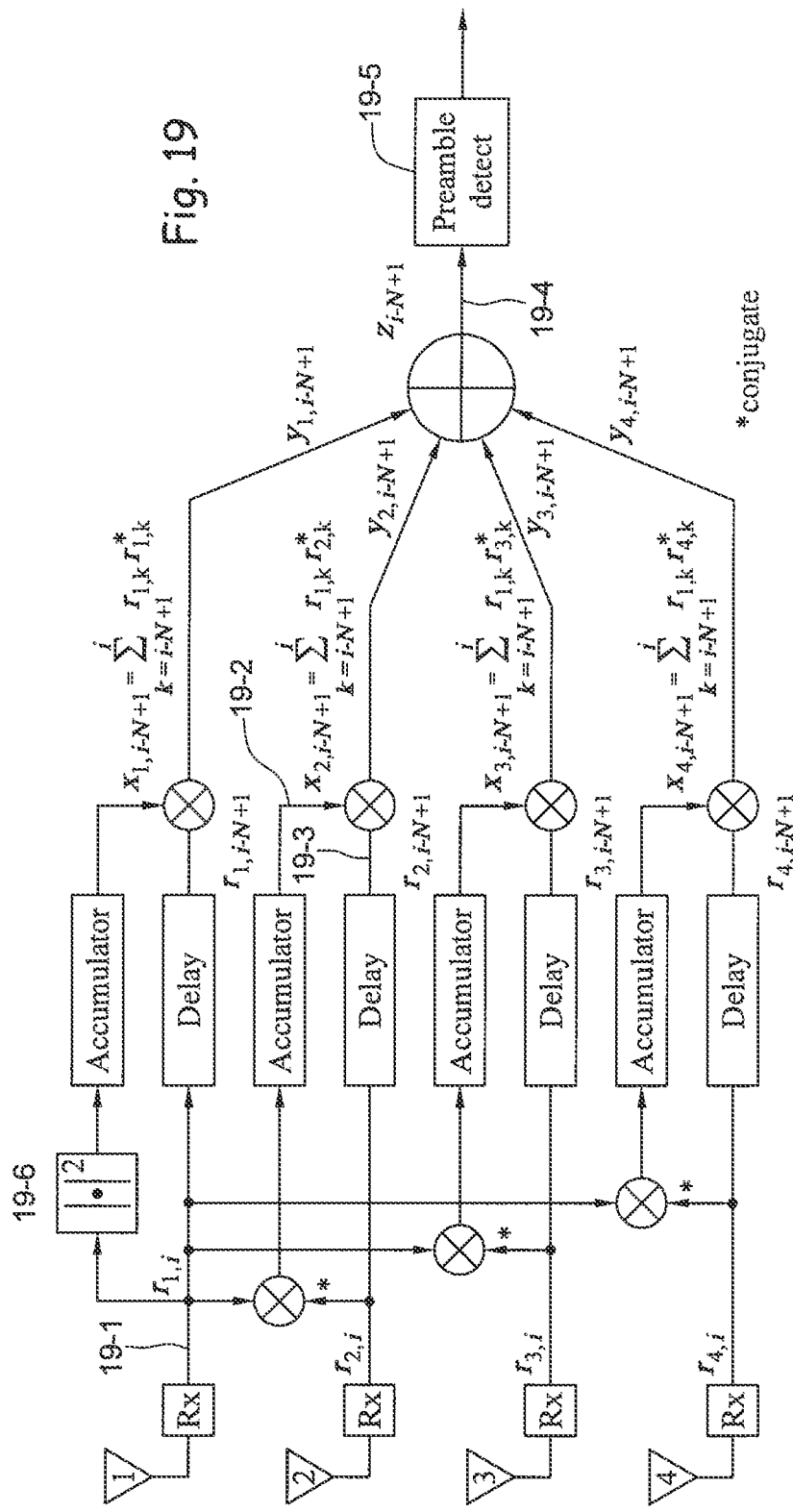
FIG. 19 is a block diagram illustrating a sub-optimal implementation of the optimum beamformer of FIG. 18.

Referring now to FIG. 19, a block diagram of a receive beamformer providing a reduced complexity alternative is disclosed. A signal from one antenna element is selected as the reference, in this example signal 19-1 from element 1. The sub-optimal beamforming coefficient 19-2 for element 2 is derived from correlating the element 2 signal with the reference element signal over the number of samples in the preamble, N. The appropriately delayed received elemental signal samples are weighted by this coefficient. For example the delayed signal 19-3 is weighted by the coefficient 19-2. This operation is repeated for the signals from the remaining elements. The sum of weighted elemental signals 19-4 can be processed downstream in the preamble detector 19-5. In mathematical terms the received complex samples from jth antenna element can be written as:

$$r_{j,i} = a_i A_j e^{j\theta_j} + n_{j,i} \tag{16},$$

where $a_i$ are data taking values of +1 and −1. $A_j$ is the amplitude of received signal from jth antenna element, and $n_{j,i}$ is noise or interference samples. Without loss of generality, assume the first antenna element is the reference and note:

$$x_{1,i-N+1} = \sum_{k=i-N+1}^{i} r_{1,k} r_{1,k}^*, \tag{17}$$

And subsequently:

$$x_{2,i-N+1} = \sum_{k=i-N+1}^{i} r_{1,k} r_{2,k}^* \tag{18}$$

$$x_{3,i-N+1} = \sum_{k=i-N+1}^{i} r_{1,k} r_{3,k}^*$$

$$x_{4,i-N+1} = \sum_{k=i-N+1}^{i} r_{1,k} r_{4,k}^*$$

To see that the correlated samples is an estimate of the optimal beam-weights, notice that for very high signal to noise ratio $$x_{1,i} \approx A_1^2, x_{2,i} \approx A_1 A_2 e^{-j(\theta_2-\theta_1)} = A_1 A_2 e^{-j\phi_2}, x_{3,i} \approx A_1 A_3 e^{-j(\theta_3-\theta_1)} = A_1 A_3 e^{-j\phi_3}, x_{4,i} \approx A_1 A_4 e^{-j(\theta_4-\theta_1)} = A_1 A_4 e^{-j\phi_4}$$ (19), which is proportional to the relative phase of the signal received at an element relative to the reference element. Let:

$$y_{1,i-N+1} = x_{1,i-N+1} r_{1,i-N+1},$$

$$y_{2,i-N+1} = x_{2,i-N+1} r_{2,i-N+1},$$

$$y_{3,i-N+1} = x_{3,i-N+1} r_{3,i-N+1},$$

$$y_{4,i-N+1} = x_{4,i-N+1} r_{4,i-N+1}$$ (20)

then $$z_{i-N+1} = y_{1,i-N+1} + y_{2,i-N+1} + y_{3,i-N+1} + y_{4,i-N+1}$$ (21)

is the beamformed signal that enters the preamble detect circuit.

Figure 20:
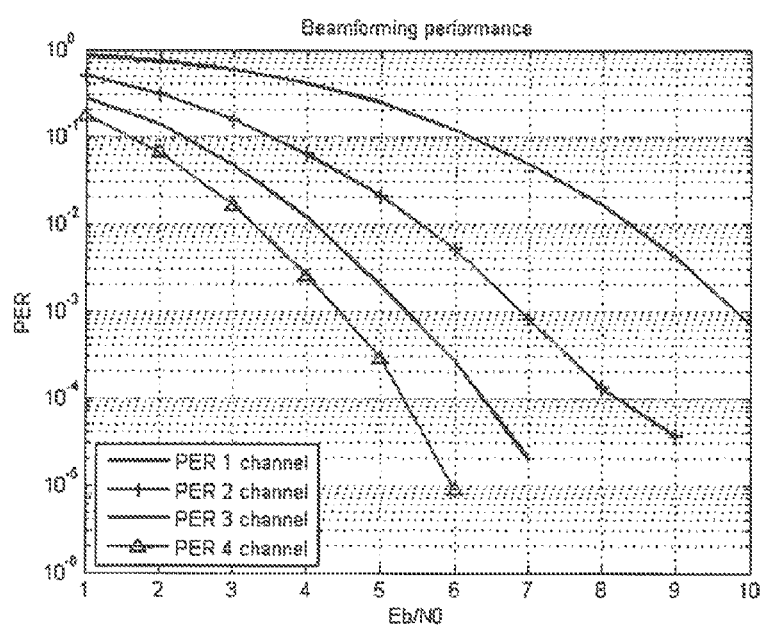
FIG. 20 shows the performance of the sub-optimal beamformer of FIG. 19.

Referring now to FIG. 20, the performance of the beamformer matches well with the ideal beamformer as shown by the simulated performance graph in FIG. 20 for beamforming using 2, 3, and 4 array element signals. For example, with two array elements, the ideal improvement in performance is 3 dB relative to a single element. At a packet error rate (PER) of $10^{-3}$, the improvement is about 2.8 dB from the figure.

Figure 21:
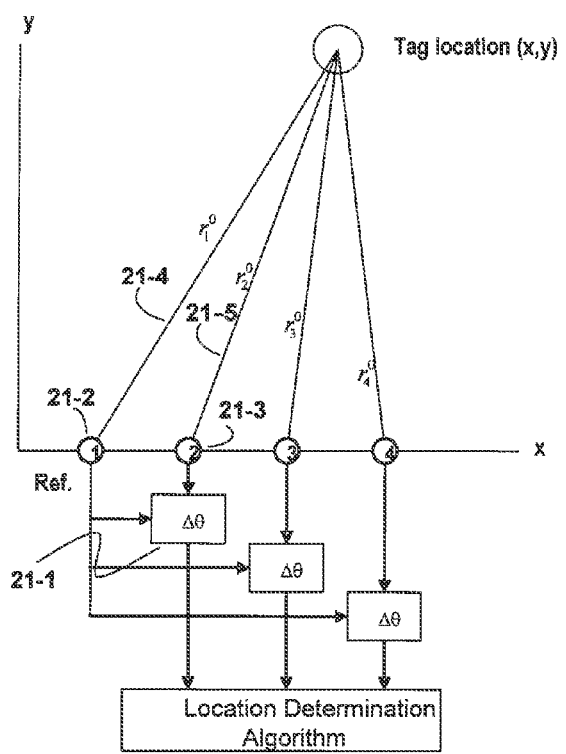
FIG. 21 is a block diagram illustrating tag location determination from differential range measurements.

Referring now to FIG. 21, another feature benefit of the array antenna RFID system is the ability to locate RFID tags. A simplified four-element array is shown in a 2D illustration of an embodiment of the tag location method. The extension to arbitrary array in 3D is straightforward for those skilled in the art. The technique is based on measuring the phase difference 21-1 of the arrival signals between a particular element 21-3 and the reference element 21-2. This phase difference is proportional to the range difference of the path between the RFID tag and the two array elements 21-4 and 21-5. In particular, the differential range is given by $$r_2^o - r_1^o = \frac{c}{2\pi f} \Delta\phi$$ (22)

where f is the carrier frequency of the RFID tag. The location of the tag, uniquely determinable from $(\hat{x}, \hat{r})$, can be calculated from the known locations of the array elements $(x_i, y_i)$ and the measured differential ranges from the very efficient algorithm where $$G = \begin{bmatrix} x_2 - x_1 & r_2 - r_1 \\ x_3 - y_1 & r_3 - r_1 \\ x_4 - x_1 & r_4 - r_1 \end{bmatrix}; Q = \begin{bmatrix} 1 & 0.5 & 0.5 \\ 0.5 & 1 & 0.5 \\ 0.5 & 0.5 & 1 \end{bmatrix};$$ (23)

$$h = \frac{1}{2} \begin{bmatrix} (r_2 - r_1)^2 - x_2^2 + x_1^2 \\ (r_3 - r_1)^2 - x_3^2 + x_1^2 \\ (r_4 - r_1)^2 - x_4^2 + x_1^2 \end{bmatrix}; r_i^2 = (x_i - x)^2 + y^2$$

$$\begin{bmatrix} \hat{x} \\ \hat{r}_1 \end{bmatrix} \approx (G^T Q^{-1} G)^{-1} G Q^{-1} h$$

The solution is based on weighted linear Least Square (LS) solution to finding the intersection the hyperbolic curves defining the differential ranges. The accuracy of the solution approaches that predicted by the Cramer-Rao Bound (CRB).

In some applications, the multipath environment may be severe and prevent accurate phase-based differential range measurement. The utility of the method represented by (6) is therefore limited. In such cases, the estimation of the direction of arrival or DOA of the RFID signal by maximizing (4) is more appropriate since the formed beam will serve to reject the multipath signal. The general formulation disclosed in FIG. 7 is now further expounded with an illustrative example. The example is based on a class of techniques known as MUSIC algorithm with spatial smoothing. In particular, to simplify notations, we examine the technique as applied to a 4 element linear array using the MUSIC algorithm with forward and backward filtering. The extension to arbitrary array is straightforward for those skilled in the art.

The signals received by the ith element of an M-element linear array each separated by a fixed distance, say $\lambda/2$, are given by $$r_i(t) = \sum_{k=1}^{N} a_k s_k(t) e^{-j(i-1)\pi \sin\theta_k} + n(t).$$ (24)

In vector notation:

$$r(t) = As(t) + n(t)$$ (25)

$$s(t) = \begin{bmatrix} s_1(t) \\ s_2(t) \\ \vdots \\ s_N(t) \end{bmatrix}; A = [a(\theta_1), a(\theta_2), \ldots, a(\theta_N)];$$

$$a(\theta_i) = \begin{bmatrix} 1 \\ e^{-j\pi \sin\theta_i} \\ \vdots \\ e^{-j(M-1)\pi \sin\theta_i} \end{bmatrix}$$

where $\theta$ is the angle of DOA relative to the antenna boresight. The signals s(t) consists of the desired signal and (N−1) multipath signals.

The first step in the algorithm is to compute spatially smoothed covariance matrix $R^F$ from U subarrays, each consists of Z elements in the forward direction. By forward direction it is meant the subarray element are taken from the array in increasing indices. For example, subarray 1 in the forward direction consists of elements (1, 2, . . . , Z) and subarray 2 in the forward direction is (2, 3, . . . , Z+1) etc. Thus $$R^F = \frac{1}{U} \sum_{p=1}^{U} R_p^F$$ (26)

$$U = M - Z + 1$$

$$R_p = [r_p, \ldots, r_{p+Z-1}][r_p, \ldots, r_{p+Z-1}]^*$$

The next step is to compute spatially smoothed covariance matrix in the backward direction $R^R$; the conjugate of the received signal is used to compute each subarray covariance $$R^R = \frac{1}{U}\sum_{p=1}^{U} R_p'^R \qquad (27)$$

$$R_p'^R = [r'_{M+1-z-p}, \ldots, r'_{M+1-p}][r'_{M+1-z-p}, \ldots, r'_{M+1-p}]^*$$

Then the R matrix from forward and reverse direction is averaged to form R'

$$R' = \tfrac{1}{2}(R^R + R^R) \qquad (28)$$

The eigenvectors for the null space of R', $E_N(\infty)$ is then computed from which the DOA θ of the signal can be found by maximizing the expression $P_{MU}(\theta)$ $$P_{MU}(\theta) = \frac{1}{a*(\theta)E_N E_N^* a(\theta)} \qquad (29)$$

Maximization of $P_{MU}(\theta)$ can be done by evaluating the expression as a function of θ and then pick the maximum. The computation burden can be reduced by using what is known as the Fast Root MUSIC algorithm. In this method the DOA is found by solving a polynomial F(z) in z=π sin θ. The coefficients for the polynomial F(z) may be determined from $E_N$.

From the DOA, or θ, measured through any of the beamforming methods disclosed herein, the location of the tag can be determined with additional processing. This can be accomplished with additional DOA measurements and or range measurements.

Figure 22:
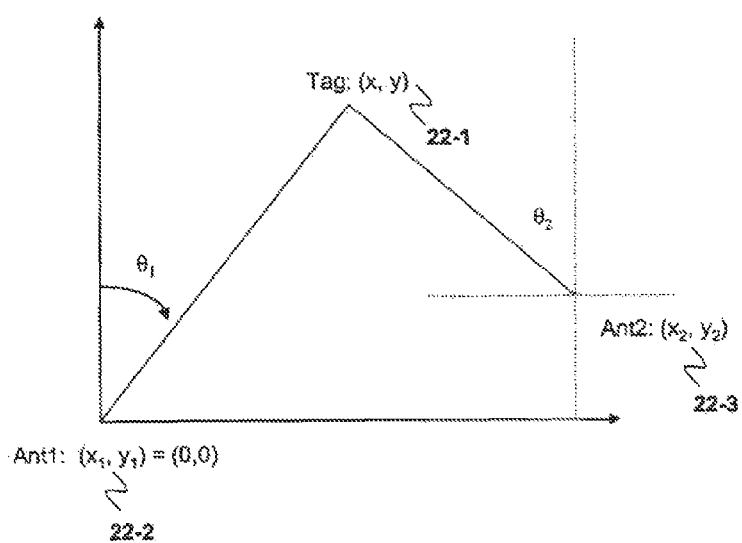
FIG. 22 is a block diagram illustrating tag location determination from direction of arrival (DOA) measurements.

Referring now to FIG. 22, the location determination of an RFID tag 22-1 through multiple DOA measurements is illustrated. In this two-dimensional rendering, the tag location can be determined from two DOA measurements when the locations of the two array antennas 22-2 and 22-3 are known. In particular, the location (x, y) of the tag can be determined from $$\begin{bmatrix} x \\ y \end{bmatrix} = \begin{bmatrix} 1 & -\tan(\theta_1) \\ 1 & -\tan(\theta_2) \end{bmatrix}^{-1} \begin{bmatrix} 0 \\ x_2 - \tan(\theta_2)y_2 \end{bmatrix} \qquad (30)$$

Another approach to determining the tag location given a DOA measurement is to measure the range of the tag to the antenna. Assuming for simplicity that the exciter and the reader are collocated. We can measure the phase of the backscatter tone at the reader relative to the exciter. If we use a different tone frequency, a different relative phase will be measured. The difference in measured relative phases of the two tones at two different frequencies due to the round trip delay is related to the differential frequency via:

$$\Delta\phi = 2\frac{2\pi\Delta f d}{c} \qquad (31)$$

where $\Delta\phi$ is differential relative phases, $\Delta f$ is differential frequency, d is distance, and c is the speed of light. The phase $\theta_1$ at tone frequency $f_1$ can be measured with a 2 mπ ambiguity. Similarly the phase at tone frequency $f_2$ can be measured with a 2 nπ ambiguity. As long as the differential phase is less than 2π, the phase difference of the modulo 2π measurements can be used to determine the range d given $\Delta f$. This is true as long as $\Delta\phi$ is less than 2π. Note that the condition can be satisfied by selecting the appropriate frequency separation given the expected range of operation. From the range d and bearing θ, the tag location can be determined for the two-dimensional example. Extension to 3D is straightforward.

The invention claimed is:

1. A method for deriving information from an RFID tag, comprising:
    transmitting RFID tag interrogation signals from at least one antenna array, each antenna array comprising a plurality of antenna elements, to an RFID tag using a transmit/receive beamformer configured to adjust relative phases of the RFID tag interrogation signals to direct the transmitted RFID tag interrogation signals in a desired direction within a read space;
    processing backscattered sequences of RFID tag information received by each of the antenna elements in the at least one antenna array from the RFID tag to form a backscattered signal by altering relative phase between the backscattered sequences of RFID tag information; and
    deriving information from the backscattered signal.

2. The method of claim 1, wherein processing by altering relative phase between the backscattered sequence of RFID tag information further comprises:
    selecting a signal from one of the antenna elements as a reference signal;
    adjusting the relative phase of the signals from each of the other antenna elements relative to the reference signal; and
    combining the adjusted relative phase signals with the reference signal to form an amplitude weighted combination of phase aligned signals having a higher gain than the signals from any one of the antenna elements.

3. The method of claim 2 wherein selecting the reference signal further comprises:
    processing the signals from each of the antenna elements to determine the relative magnitudes of the signals; and
    selecting the signal from the antenna element with the highest relative magnitude as the reference signal.

4. The method of claim 1 further comprising:
    transmitting second RFID tag interrogation signals at a second frequency to derive RFID tag information from a second RFID tag.

5. The method of claim 1 further comprising:
    iterating the transmitting, processing and deriving to further alter the relative phases.

6. The method of claim 1 wherein processing the backscattered sequences of RFID tag information further comprises:
    estimating the relative phase difference between the signals from each of the other antenna elements and the reference signal; and
    deriving the relative range from each of the antenna elements to the RFID tag in accordance with the relative phase difference for each such antenna element.

7. The method of claim 6 further comprising:
    deriving the location of the RFID tag from the relative ranges for each such antenna element.

8. The method of claim 1 wherein processing the backscattered sequences of RFID tag information further comprises:
    deriving the relative phase differences between the signals from each of the other antenna elements and the reference signal; and
    deriving relative direction of arrival of the received signals from the RFID tag at each of the antenna elements.

9. The method of claim 8 further comprising:
    deriving relative direction of arrival information of signals from the RFID tag at each antenna element of a second array of antenna elements in response to second interrogation signals transmitted by the second array; and
determining the location of the RFID tag by combining the relative direction of arrival information derived from signals received at each array.

10. The method of claim 9 further comprising:
iterating the transmitting, processing and deriving to improve accuracy of relative direction of arrival information derived from the signals at each antenna element after the RFID tag information has been derived.

11. The method of claim 5 wherein iterating further comprises:
combining the RFID tag information derived from each of a plurality of iterations to form a correlation matrix; and
applying an algorithm to the correlation matrix to reduce multipath effects in the direction of arrival information for each antenna element.

12. The method of claim 1 further comprising dividing the read space in which the at least one antenna array transmits into a plurality of spatial cells.

13. The method of claim 12 wherein the plurality of spatial cells are equally spaced polyhedrons.

14. The method of claim 12 wherein dividing the read space into a plurality of spatial cells comprises scheduling transmission of RFID tag interrogation signals to different spatial cells within different time slots.

15. The method of claim 14 wherein dividing the read space into a plurality of spatial cells comprises utilizing different frequencies for RFID tag interrogation signals transmitted within a particular time slot in at least a subset of the plurality of spatial cells.

16. The method of claim 14 wherein the RFID tag interrogation signals transmitted within a plurality of time slots have different durations of transmission.

17. The method of claim 14 wherein the scheduled RFID tag interrogation signals are scheduled to be transmitted to spatial cells that are selected randomly.

18. The method of claim 12 wherein the at least one antenna array includes a plurality of antenna arrays and wherein dividing the read space into a plurality of spatial cells comprises scheduling a plurality of RFID tag interrogation signals to transmit from different antenna arrays to different spatial cells in the same time slot.

19. The method of claim 18 wherein at least some of the plurality of scheduled RFID tag interrogation signals are scheduled to be transmitted at different frequencies.

20. The method of claim 1 further comprising scheduling RFID tag interrogation signals to be transmitted within predetermined time slots using a beamformer scheduler.

21. The method of claim 20 wherein scheduling RFID tag interrogation signals to be transmitted within predetermined time slots using a beamformer scheduler comprises scheduling a plurality of RFID tag interrogation signals to be transmitted in non-overlapping beams within the same time slot.

22. The method of claim 1 further comprising scheduling RFID tag interrogation signals to be transmitted at different frequencies using a beamformer scheduler.

23. The method of claim 1 wherein the transmit/receive beamformer applies complex weights including amplitude and phase components to each transmitted signal.

24. The method of claim 23 wherein the transmit/receive beamformer comprises a numerically controlled oscillator configured with phase and frequency corrections and a plurality of mixers to mix the outputs of the numerically controlled oscillator with baseband signals to generate RFID tag interrogation signals.

25. The method of claim 1 wherein processing the backscattered sequences of RFID tag information further comprises:
deriving the relative phase differences between the signals from each of the other antenna elements and the reference signal; and
deriving range differences from the RFID tag to the antenna elements using the relative phase differences.

26. An RFID reader system for deriving information from an RFID tag, comprising:
at least one antenna array, each antenna array comprising a plurality of antenna elements; and
a transmit/receive module configured to:
transmit RFID tag interrogation signals to an RFID tag using the at least one antenna array by adjusting relative phases of the RFID tag interrogation signals to direct the transmitted RFID tag interrogation signals in a desired direction within a read space;
process backscattered sequences of RFID tag information received by each of the antenna elements in the at least one antenna array from the RFID tag to form a backscattered signal by altering relative phase between the backscattered sequences of RFID tag information; and
derive information from the backscattered signal.

27. The RFID reader system of claim 26 wherein processing by altering relative phase between the backscattered sequences of RFID tag information further comprises:
selecting a signal from one of the antenna elements as a reference signal;
adjusting the relative phase of the signals from each of the other antenna elements relative to the reference signal; and
combining the adjusted relative phase signals with the reference signal to form an amplitude weighted combination of phase aligned signals having a higher gain than the signals from any one of the antenna elements.

28. The RFID reader system of claim 27 wherein selecting the reference signal further comprises:
processing the signals from each of the antenna elements to determine the relative magnitudes of the signals; and
selecting the signal from the antenna element with the highest relative magnitude as the reference signal.

29. The RFID reader system of claim 26 wherein the transmit/receive module is further configured to transmit second RFID tag interrogation signals at a second frequency using the at least one antenna array to derive RFID tag information from a second RFID tag.

30. The RFID reader system of claim 26 wherein the transmit/receive module is further configured to:
iterate the transmitting, processing and deriving to further alter the relative phases.

31. The RFID reader system of claim 26 wherein processing the backscattered sequences of RFID tag information further comprises:
estimating the relative phase difference between the signals from each of the other antenna elements and the reference signal; and
deriving the relative range from each of the antenna elements to the RFID tag in accordance with the relative phase difference for each such antenna element.

32. The RFID reader system of claim 31 wherein the transmit/receive module is further configured to:
derive the location of the RFID tag from the relative ranges for each such antenna element.

33. The RFID reader system of claim 26 wherein processing the backscattered sequences of RFID tag information further comprises:
  deriving the relative phase differences between the signals from each of the other antenna elements and the reference signal; and
  deriving relative direction of arrival of the received signals from the RFID tag at each of the antenna elements.

34. The RFID reader system of claim 33 wherein the transmit/receive module is further configured to:
  derive relative direction of arrival information of signals from the RFID tag at each antenna element of a second array of antenna elements in response to second interrogation signals transmitted by the second array; and
  determine the location of the RFID tag by combining the relative direction of arrival information derived from signals received at each array.

35. The RFID reader system of claim 34 wherein the transmit/receive module is further configured to:
  iterate the transmitting, processing and deriving to improve accuracy of relative direction of arrival information derived from the signals at each antenna element after the RFID tag information has been derived.

36. The RFID reader system of claim 30 wherein iterating further comprises:
  combining the RFID tag information derived from each of a plurality of iterations to form a correlation matrix; and
  applying an algorithm to the correlation matrix to reduce multipath effects in the direction of arrival information for each antenna element.

37. The RFID reader system of claim 26 wherein the transmit/receive module is further configured to divide the read space in which the at least one antenna array transmits into a plurality of spatial cells.

38. The RFID reader system of claim 37 wherein the plurality of spatial cells are equally spaced polyhedrons.

39. The RFID reader system of claim 37 wherein dividing the read space into a plurality of spatial cells comprises scheduling transmission of RFID tag interrogation signals to different spatial cells within different time slots.

40. The RFID reader system of claim 39 wherein dividing the read space into a plurality of spatial cells comprises utilizing different frequencies for RFID tag interrogation signals transmitted within a particular time slot in at least a subset of the plurality of spatial cells.

41. The RFID reader system of claim 39 wherein the RFID tag interrogation signals transmitted within a plurality of time slots have different durations of transmission.

42. The RFID reader system of claim 39 wherein the scheduled RFID tag interrogation signals are scheduled to be transmitted to spatial cells that are selected randomly.

43. The RFID reader system of claim 37 wherein the at least one antenna array includes a plurality of antenna arrays and wherein dividing the read space into a plurality of spatial cells comprises scheduling a plurality of RFID tag interrogation signals to transmit from different antenna arrays to different spatial cells in the same time slot.

44. The RFID reader system of claim 43 wherein at least some of the plurality of scheduled RFID tag interrogation signals are scheduled to be transmitted at different frequencies.

45. The RFID reader system of claim 26 wherein the transmit/receive module is further configured to schedule RFID tag interrogation signals to be transmitted within predetermined time slots using a beamformer scheduler.

46. The RFID reader system of claim 45 wherein scheduling RFID tag interrogation signals to be transmitted within predetermined time slots using a beamformer scheduler comprises scheduling a plurality of RFID tag interrogation signals to be transmitted in non-overlapping beams within the same time slot.

47. The RFID reader system of claim 26 wherein the transmit/receive module is further configured to schedule RFID tag interrogation signals to be transmitted at different frequencies using a beamformer scheduler.

48. The RFID reader system of claim 26 wherein the transmit/receive module is further configured to apply complex weights including amplitude and phase components to each transmitted signal.

49. The RFID reader system of claim 48 wherein the transmit/receive module comprises a numerically controlled oscillator configured with phase and frequency corrections and a plurality of mixers to mix the outputs of the numerically controlled oscillator with baseband signals to generate RFID tag interrogation signals.

50. The RFID reader system of claim 26 wherein processing the backscattered sequences of RFID tag information further comprises:
  deriving the relative phase differences between the signals from each of the other antenna elements and the reference signal; and
  deriving range differences from the RFID tag to the antenna elements using the relative phase differences.

* * * * *